United States Patent
Tenmyo

[11] Patent Number: 6,058,271
[45] Date of Patent: May 2, 2000

[54] ILLUMINATION DEVICE

[75] Inventor: Yoshiharu Tenmyo, Kanagawa-ken, Japan

[73] Assignee: Canon Kabushiki Kaisha, Tokyo, Japan

[21] Appl. No.: 08/942,377

[22] Filed: Oct. 1, 1997

Related U.S. Application Data

[63] Continuation of application No. 08/602,511, Feb. 20, 1996, abandoned.

[30] Foreign Application Priority Data

Feb. 23, 1995 [JP] Japan ................................ 7-035288

[51] Int. Cl.⁷ .......................... G03B 15/03; G03B 15/06; G03B 17/00
[52] U.S. Cl. ........................ 396/198; 396/200; 396/267
[58] Field of Search .................................. 385/129, 146, 385/901; 396/162, 315

[56] References Cited

U.S. PATENT DOCUMENTS

| | | | |
|---|---|---|---|
| 4,129,898 | 12/1978 | Ohrstedt | 362/7 |
| 4,171,889 | 10/1979 | Agari et al. | 354/56 |
| 4,215,924 | 8/1980 | Matsumoto | 354/59 |
| 4,696,889 | 9/1987 | Yevick | 430/311 |
| 5,337,104 | 8/1994 | Smith et al. | 354/149.11 |
| 5,387,956 | 2/1995 | Stephenson, III et al. | 354/149.1 |
| 5,740,483 | 4/1998 | Hashimoto et al. | 396/315 |
| 5,799,126 | 8/1998 | Nagatani et al. | 385/146 |

OTHER PUBLICATIONS

Patent Abstracts of Japan No. JP–A–59 165037, published Sep. 18, 1984, vol. 9, No. 20.

*Primary Examiner*—Daniel Malley
*Assistant Examiner*—Christopher Mahoney
*Attorney, Agent, or Firm*—Robin, Blecker & Daley

[57] ABSTRACT

An illumination device for photography includes a guide part arranged to guide, through the inside of a dense member, a light emitted from a flash light emitting part disposed in a camera body and to cause the light to exit from a position located away from the camera body. The member is shaped in such a way as to enhance the illuminating efficiency of the illumination device by converging the light in the process of guiding the light. The illumination device is thus arranged to be capable of preventing a red-eye phenomenon without lowering the illuminating efficiency and without incurring a complex structural arrangement.

44 Claims, 18 Drawing Sheets

ILLUMINATION DEVICE

This is a continuation application under 37 CFR 1.62 of prior application Ser. No. 08/602,511, filed Feb. 20, 1996 now abandoned.

BACKGROUND OF THE INVENTION

1. Field of the Invention

This invention relates to an illumination device used in performing flash photography or the like.

2. Description of the Related Art

In the conventional illumination devices of the above-stated kind arranged, for example, as disclosed in Japanese Laid-Open Patent Application No. SHO 57-150826, etc., a light emitting part of an electronic flash device is arranged to be fixedly held in position away from the optical axis of the photo-taking optical axis of a camera when the electronic flash device is being used and to be bent forward into a shape of being integral with the camera body when the electronic flash device is not being used. Another illumination device, disclosed in Japanese Laid-Open Patent Application No. SHO 59-165037, is arranged to converge a light flux emitted from a flash lamp into a strip-like shape through a light converging part and to obtain a desired distribution of luminous intensity through optical fibers disposed in the light converging part by bundling the optical fibers in a suitable manner.

The former arrangement cited above, however, has presented the following shortcomings. Since a flash lamp, a reflecting shade, etc., which constitute the swingable light emitting part of the electronic flash device are disposed at the fore end of a swingable part, the size of the light emitting part would be increased. Further, since the electronic flash device necessitates connection of electric parts for flashing, a sufficient reliability of the electronic flash device must be ensured against an electric shock, a repeating load on electric connection parts, etc. Therefore, the arrangement of the electronic flash device inevitably becomes complex and expensive.

The latter arrangement cited above, on the other hand, has presented the following shortcomings. In this arrangement, the optical fibers are bendably disposed in the light converging part, and the distribution of luminous intensity is controlled by the manner in which the optical fibers are bundled. However, since the optical fibers cannot be laid down and arranged without any gap, it is inevitable to have some loss of light quantity. Besides, the optical fibers are very expensive. In addition to these shortcomings, it is impossible to control the distribution of luminous intensity within the optical fibers (or a light transmitting part).

SUMMARY OF THE INVENTION

This invention is directed to the elimination of the above-stated shortcomings of the conventional devices.

It is one aspect of this invention to provide an illumination device, or a camera, comprising light emitting means, and optical means for guiding, through a member, light emitted from the light emitting means in a longitudinal direction of the member and converging the light toward an object so as to radiate the light emitted from the light emitting means.

It is another aspect of this invention to provide a camera comprising light emitting means disposed in a camera body, and optical means for guiding, through a member, light emitted from the light emitting means toward a position located away from the camera body in a direction different from a direction of an object so as to radiate the light emitted from the light emitting means from the position located away from the camera body toward the object.

The above and other aspects and features of this invention will become apparent from the following detailed description of embodiments thereof taken in connection with the accompanying drawings.

DETAILED DESCRIPTION OF THE PREFERRED EMBODIMENTS

First Embodiment

Figure 1:
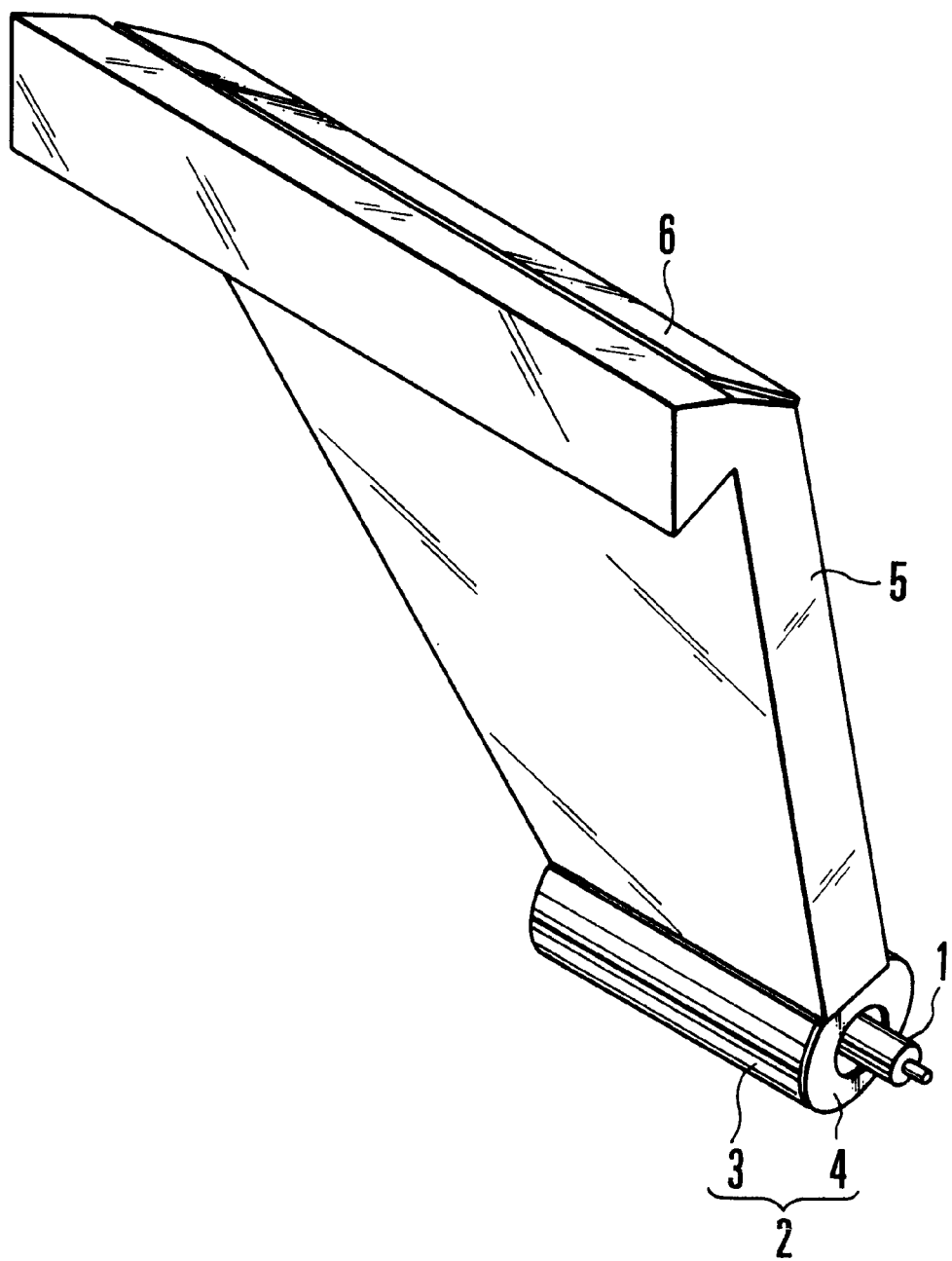
FIG. 1 is an oblique view showing the fundamental arrangement of the optical system of a photo-taking illumination device arranged according to this invention as a first embodiment thereof.
Figure 2:
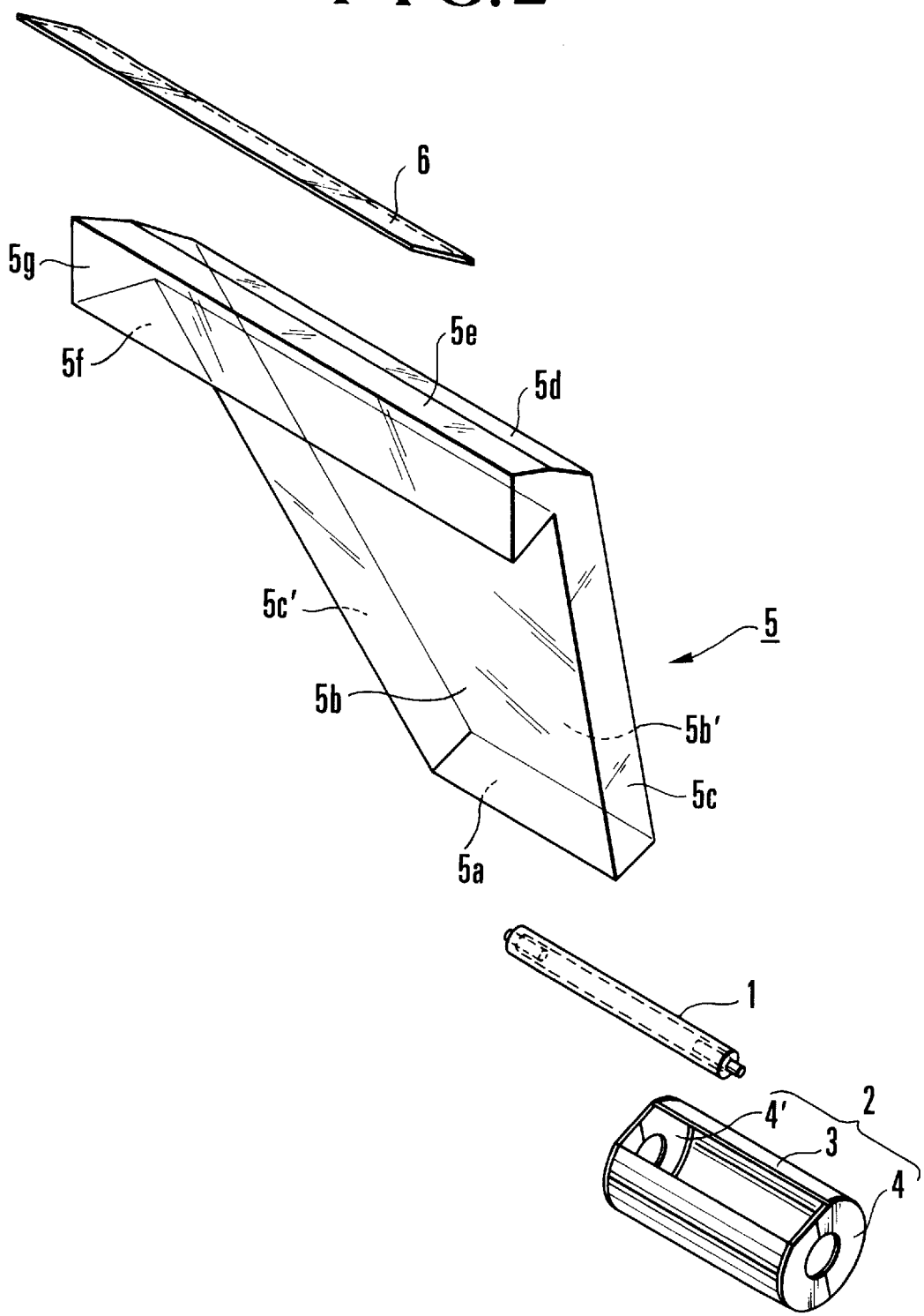
FIG. 2 is an exploded oblique view showing the optical system of the photo-taking illumination device which is the first embodiment of this invention.

FIGS. 1 and 2 are oblique views showing the fundamental arrangement of the optical system of a photo-taking illumination device which is arranged according to this invention as a first embodiment thereof. The illumination device shown in FIG. 1 is in a state of being used. In FIG. 2, the details of essential components of the illumination device are shown in an exploded state.

Referring to FIGS. 1 and 2, a flash lamp 1 is arranged to emit a flash light as an auxiliary light source for photographing. The flash lamp 1 is disposed in a predetermined position within a reflecting shade 2. The reflecting shade 2 has a reflecting surface of a high reflection factor formed on its inner side to converge the light emitted from the flash lamp 1. The reflecting shade 2 is composed of a main reflecting surface 3 and side reflecting surfaces 4 and 4'.

An optical panel 5 which is made of glass or some transparent resin material is a light guiding member arranged to guide the light converged by the reflecting shade 2 up to a light exit surface. The shape, etc., of the optical panel 5 are configured not only to give a light guiding function but also to converge the light and change the direction of the light without much loss of light, as will be described later herein.

The optical panel 5 is composed of a light entrance surface 5a, main reflecting surfaces 5b and 5b', side reflecting surfaces 5c and 5c', a light direction changing surface 5d, light direction correcting surfaces 5e and 5f, and a light exit surface 5g. The light entrance surface 5a and the light exit surface 5g are transmissible surfaces. The surfaces other than these surfaces 5a and 5g are arranged to be used basically as total reflection surfaces. The optical panel 5 is thus smoothly finished to have mirror-like surfaces all over.

A reflecting plate 6 has a bright surface on one side adjoining the optical panel 5 and is arranged to cause a component which is left not totally reflected by the light direction changing surface 5d of the optical panel 5 to come again into the optical panel 5.

As can be appreciated from the above description and from FIGS. 1 and 2, the optical panel 5 thus provides a light guiding portion defined by main reflecting surfaces 5b and 5b' and side reflecting surfaces 5c and 5c' which continuously increases in cross sectional area in the advancing direction of the light, i.e., in a first direction from the light entrance surface 5a toward the light direction changing surface 5d. The surface 5d in conjunction with the light direction correcting surfaces 5e and 5f and the reflecting plate 6 change the direction of the light so it proceeds in a second direction from the light direction changing surface 5d toward the light exit surface or emission portion 5g. The portion of the optical panel 5 comprising the surfaces 5a, 5b, 5b', 5c and 5c' thus forms a first guide portion for directing light in the first direction. This first guide portion has a length which is greater than the length of a second guide portion comprising the surfaces 5d, 5e and 5f of the optical panel 5 and the mirror 6 which guides light in the second direction.

Figure 3:
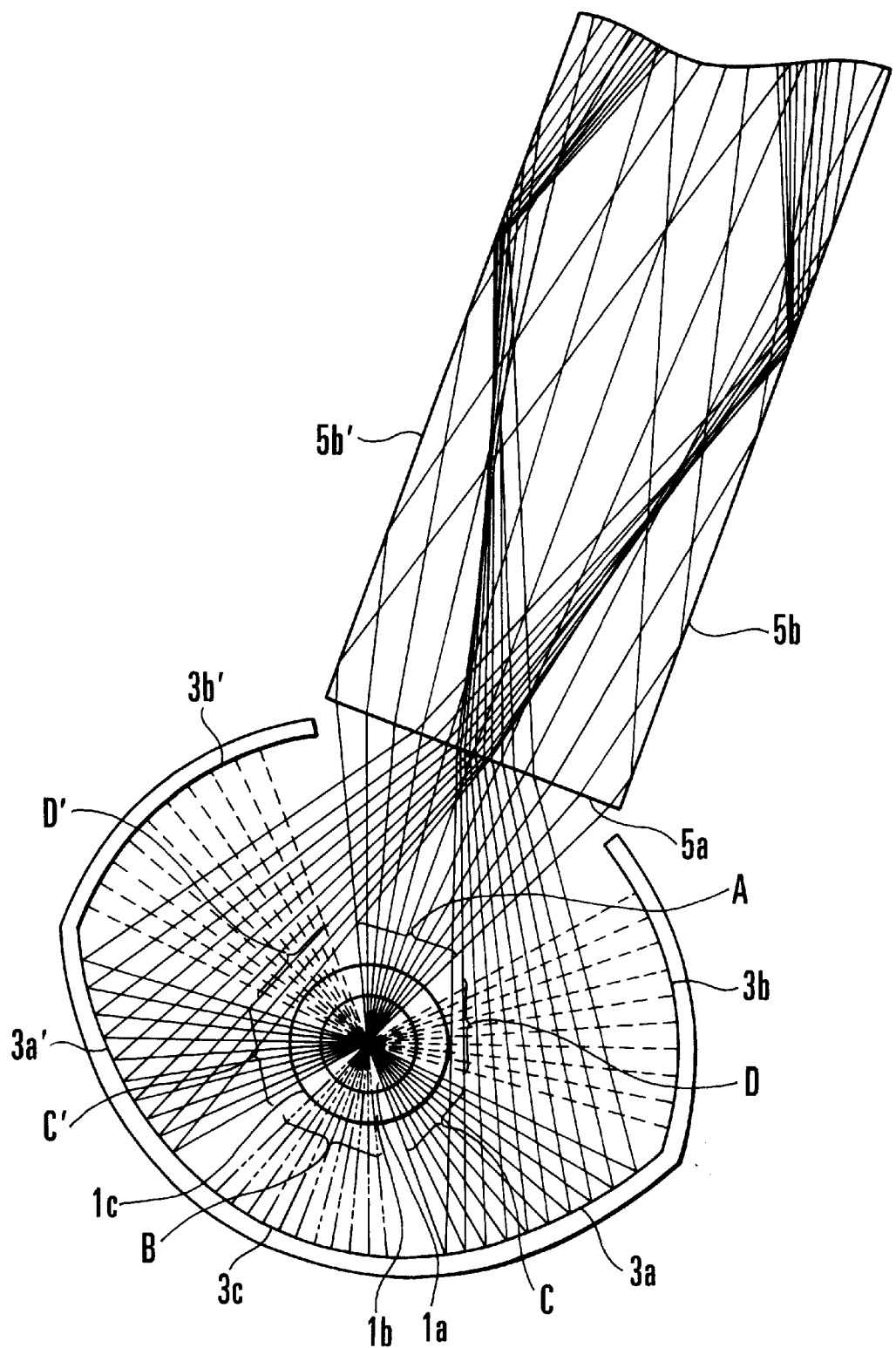
FIG. 3 is a sectional view of the photo-taking illumination device of the first embodiment taken perpendicular to a flash lamp of the device.
Figure 4:
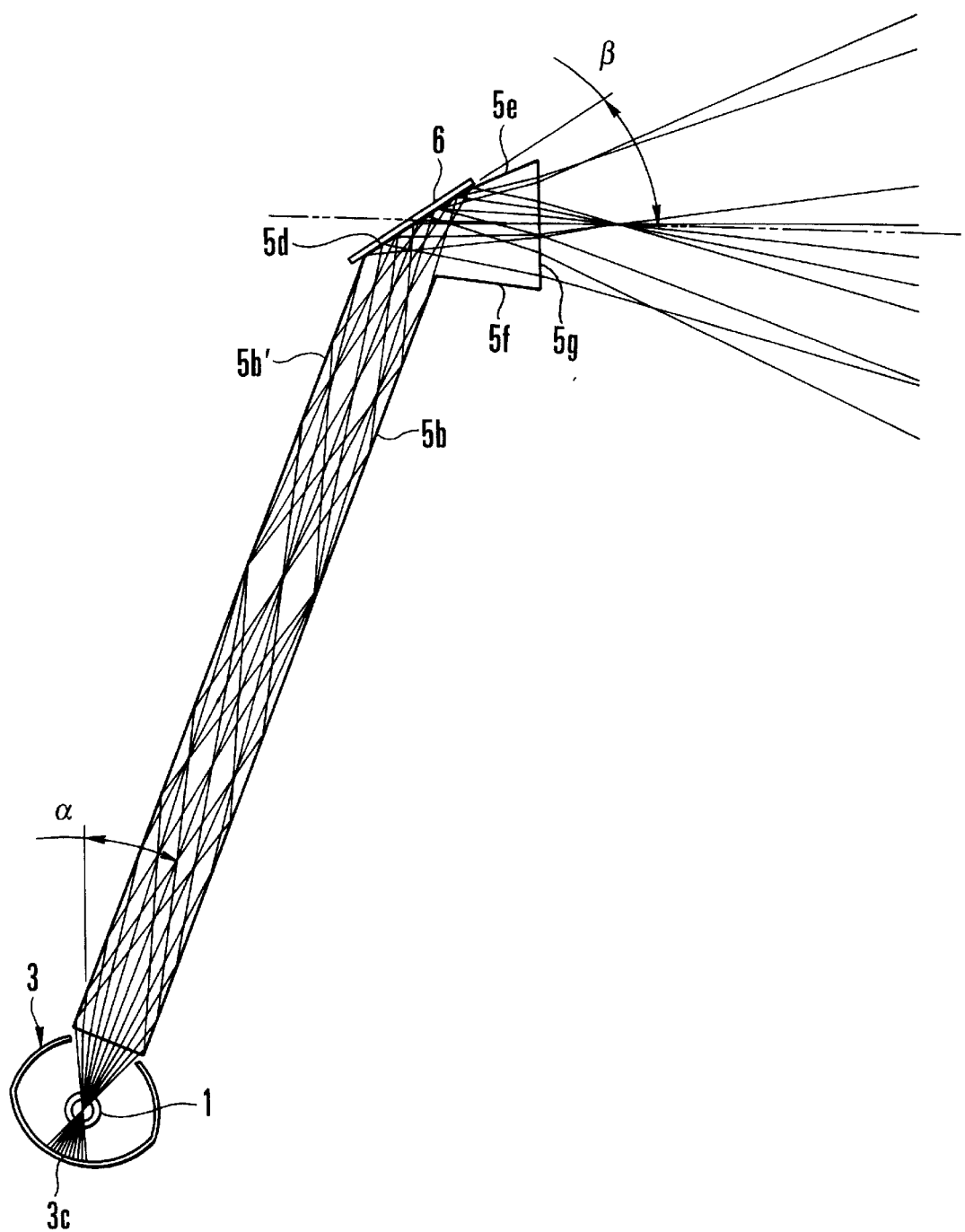
FIG. 4 is another sectional view of the photo-taking illumination device of the first embodiment taken perpendicular to the flash lamp of the device.

Referring to FIGS. 3 and 4 which show traces of rays of light obtained by the arrangement of FIG. 1, the action of each of the parts arranged as shown in FIG. 1 is next described as follows. FIGS. 3 to 7 are sectional views taken perpendicular to the flash lamp 1 of FIG. 1 showing, at the same time, the traces of representative rays of a light flux emitted from the center of the flash lamp 1.

FIG. 3 is an enlarged sectional view showing in detail the shape of the main reflecting surface 3 of the reflecting shade 2. In FIG. 3, elliptic surfaces 3a and 3a' are located obliquely in rear with respect to the optical axis of flash light emission and have their focal points at the center 1a of the flash lamp 1. Cylindrical surfaces 3b and 3b' are located obliquely in front with respect to the optical axis of the flash light emission and have their centers at the flash lamp 1. A cylindrical surface 3c is located in rear with respect to the optical axis of the flash light emission and has its center at the flash lamp 1. These curved surfaces 3a, 3a', 3b, 3b', and 3c are preferably formed to leave no gaps between them. In the case of this embodiment, they are formed in one body.

FIG. 3 also shows the traces of rays of the light flux emitted from the center 1a of the flash lamp 1. The action of each of the above-stated component parts of the reflecting shade 2 are described with reference to the traces of the rays of light as follows.

The light emitted from the flash lamp 1 basically includes components of two different kinds. After incidence on the optical panel 5, the light components are repeatedly total-reflected to be converted into angular components suited for guiding to the light exit surface.

The light component of one of the two kinds advances directly to the optical panel 5 from the flash lamp 1 and exits from the reflecting shade 2 within an angular range defined by the aperture of the reflecting shade 2. That light component includes a component defined by a range A in FIG. 3 (hereinafter referred to as the component A), and another component defined by a range B and emitted in a direction opposite to the component A (hereinafter referred to as the component B).

The component A comes to be incident on the entrance surface 5a of the optical panel 5 at an angle which is relatively close to perpendicularity. After incidence on the optical panel 5, the component A remains close to the advancing direction of rays of light. Therefore, the component A easily repeats total reflection at the main reflecting surfaces 5a and 5b', so that the component A can be guided in the predetermined direction with little loss of light quantity.

The component B (indicated with two-dot chain lines in FIG. 3) advances in a direction which is opposite to the direction of the component A. Then, the component B is reflected back to the center 1a of the flash lamp 1 by the cylindrical surface 3c which has its center at the flash lamp 1. After coming back to the flash lamp 1, the rays of light of the component A are controlled to pass the same optical path as the above-stated component A.

The reflecting surface 3c located in rear of the flash lamp 1 is arranged to be in a cylindrical shape for the purpose of avoiding an adverse effect of a glass tube 1b of the flash lamp 1. This is because, although a light flux emitted toward the rear of the flash lamp 1 is likely to come back to be incident again on the flash lamp 1 after reflection by the reflecting surface 3c, if the incident angle on a surface 1c of the glass tube 1b of the flash lamp 1 is large, the light flux would be greatly affected by the refraction of the glass tube 1b to increase a loss of light by allowing a large portion of the light to go in directions other than the desired direction. To solve this problem, the embodiment is arranged to bring the light flux emitted toward the rear of the flash lamp 1 back to the center 1a of the flash lamp 1, so that the possible adverse effect of the refraction of the glass tube 1b of the flash lamp 1 can be minimized.

The light component of the other kind, on the other hand, advances sideways with respect to the optical axis and are controlled by the reflecting surfaces 3a, 3a', 3b and 3b'. Of that component, components which are coming obliquely to the rear with respect to the optical axis of the flash lamp 1 within ranges C and C' as shown in FIG. 3 (hereinafter referred to as the components C and C') are reflected by the reflecting surfaces 3a and 3a'. Since the reflecting surfaces 3a and 3a' are formed by the ellipse having one focal point at the center 1a of the flash lamp 1, the components C and C' are reflected in such a way as to be converged on the other focal point of the ellipse. In this instance, the reflected light is angle-converted to be closer to the optical axis without being affected by the glass tube 1b of the flash lamp 1. Therefore, after incidence on the entrance surface 5a of the optical panel 5, the components C and C' are controlled as components close to the desired direction of rays of light, so that they can easily repeat total reflection at the main reflecting surfaces 5b and 5b'.

Meanwhile, components which come obliquely to the front with respect to the optical axis and are shown within ranges D and D' in FIG. 3 (hereinafter referred to as the components D and D') are reflected and controlled by the cylindrical surfaces 3b and 3b' which have their centers at the flash lamp 1, in such a way as to come back to the center 1a of the flash lamp 1. After coming back to the flash lamp 1, the rays of light of these components D and D' are controlled to pass through optical paths similar to those of the components C and C'.

The surface 3b and 3b' are formed in a cylindrical shape for the purpose of preventing the adverse effect of the glass tube 1b of the flash lamp 1 and for effectively utilizing the light converging effect of the surfaces 3a and 3a' which are in an elliptic shape on the rays of light coming in the directions of the surfaces 3b and 3b'.

The main reflecting surface 3 of the reflecting shade 2 which is formed as described above enables light components located around the center of the light flux emitted from the flash lamp 1 to be incident on the optical panel 5 with little loss of light and also makes their directions of incidence controllable to be approximately within a predetermined range of angles.

The conditions in respect of the shape of the embodiment include the following:

(i) The smaller the diameter of the glass tube 1b of the flash lamp 1 is, the more effective the control over the light flux with little loss of light.

(ii) The thinner the thickness of the glass tube 1b of the flash lamp 1 is, the less the loss of light to permit effective control.

(iii) The aperture part of the reflecting shade 2 is preferably wide enough to have the prolonged line of a tangent line which contacts with the effective part of the flash lamp 1 passing an intersecting point of the optical axis in rear of the reflecting shade 2 never intersects with any part of the reflection shade 2.

In other words, the diameter of the aperture part of the reflecting shade 2 is arranged to be close to the effective diameter of the flash lamp 1 by arranging the reflecting shade 2 to be large enough with respect to the effective light emitting part of the flash lamp 1, so that the optical panel 5 located in the rear part can be made thin.

The traces of rays of light obtained all over the longitudinal section of this invention are next described with reference to FIGS. 4 to 7 as follows.

FIG. 4 shows mainly the traces of rays of the light component which are directly incident on the optical panel 5 after light emission from the flash lamp 1 in the longitudinal section of the embodiment. Further, another light component which goes to the rear of the flash lamp 1 is also shown, because it eventually comes to pass an equivalent optical path after it is reflected by the cylindrical surface 3c provided in the rear part.

The reflecting surfaces 5b to 5f of the optical panel 5 form an optical system utilizing total reflection for preventing a loss of light. In actuality, rays of light the incident angle of which fails to be within a critical angle, among the rays of light incident on the light direction changing surface 5d after impinging on the main reflecting surface 5b, go outside of the optical parel 5. These rays of light are then caused by the reflecting plate 6 to be again incident on the optical panel 5. Since the rays of light which go outside the optical panel 5 from the light direction changing surface 5d have acute angles, the reflecting plate 6 must be disposed near to the light direction changing surface 5d.

A feature of the above-stated optical system lies in that the optical panel 5 is slanted forward to a degree of angle at which the amount of the light component going outside of the optical panel 5 at the light direction changing surface 5d can be minimized. The forward slanting angle α and an angle β between the target direction of light (shown with a two-dot chain line in FIG. 4) and the horizontal direction of the light direction changing surface 5d are in the following relation:

$$\alpha \approx 2 \times (45° - \beta)$$

With the above-stated relation established, the direction of the flash light emitted is changed to the forward direction, so that a distribution of luminous intensity can be obtained as desired.

The optimum slanting angle of the optical panel 5 is described as follows. If the slanting angle α is too small, the light is apt to escape rearward without being total-reflected, thus causing a loss of light quantity. If the slanting angle α is too large, on the other hand, it becomes impossible to cover the whole light flux unless the light direction changing surface 5d is arranged to have a wide area, although the total reflection becomes easier. The large slanting angle thus tends to result in a larger size of the light direction changing part. Besides, in that instance, a distance from the light direction changing part to the light exist surface 5g also must be increased for preventing a loss of light quantity. In view of these points, in the case of this embodiment, the angles α and β are set as follows:

$$\alpha = 20° \qquad \beta = 35°$$

The tolerance limits for these angles are as follows. A higher refractive index of the material of the optical panel 5 makes total reflection easier and thus permits setting the angle α at a smaller degree. The uniformness of the rays of light incident on the optical panel 5 makes a difference in adjusting the direction of light to the direction of the optical axis within the reflecting shade 2. If they are in uniform array, the angle α can be set at a smaller degree. Further, if the thickness of the optical panel 5 is thin, the size of the light direction changing surface 5d does not much increase even if the angle β is small. With these things taken into consideration, these angles α and β are preferably set within the following ranges, respectively:

$$0° \leq \alpha \leq 40° \quad 25° \leq \beta \leq 45°$$

With the shape set as mentioned above, the traces of rays of light are obtained as follows. In a case where the light flux emitted from the flash lamp 1 is directly incident on the light entrance surface 5a, the angles of rays of light do not much deviate from the optical axis. The rays of light are almost total-reflected by the light direction changing surface 5d and reach the light exit surface 5g to be emitted therefrom without being reflected to the light direction correcting surfaces 5e and 5f. The rays of light which are thus total-reflected by the light direction changing surface 5d without touching the light direction correcting surfaces 5e and 5d are thus allowed to make their exit in a state of retaining the distribution of light obtained when they are incident on the light entrance surface 5a, because they are reflected only by the surfaces 5b and 5b' which are evenly spaced. In this case, therefore, there is no loss of light.

The rays of light which are reflected by the elliptic surfaces 3a and 3a' of the reflecting shade 2 are next described below with reference to FIGS. 5 and 6.

Figure 5:
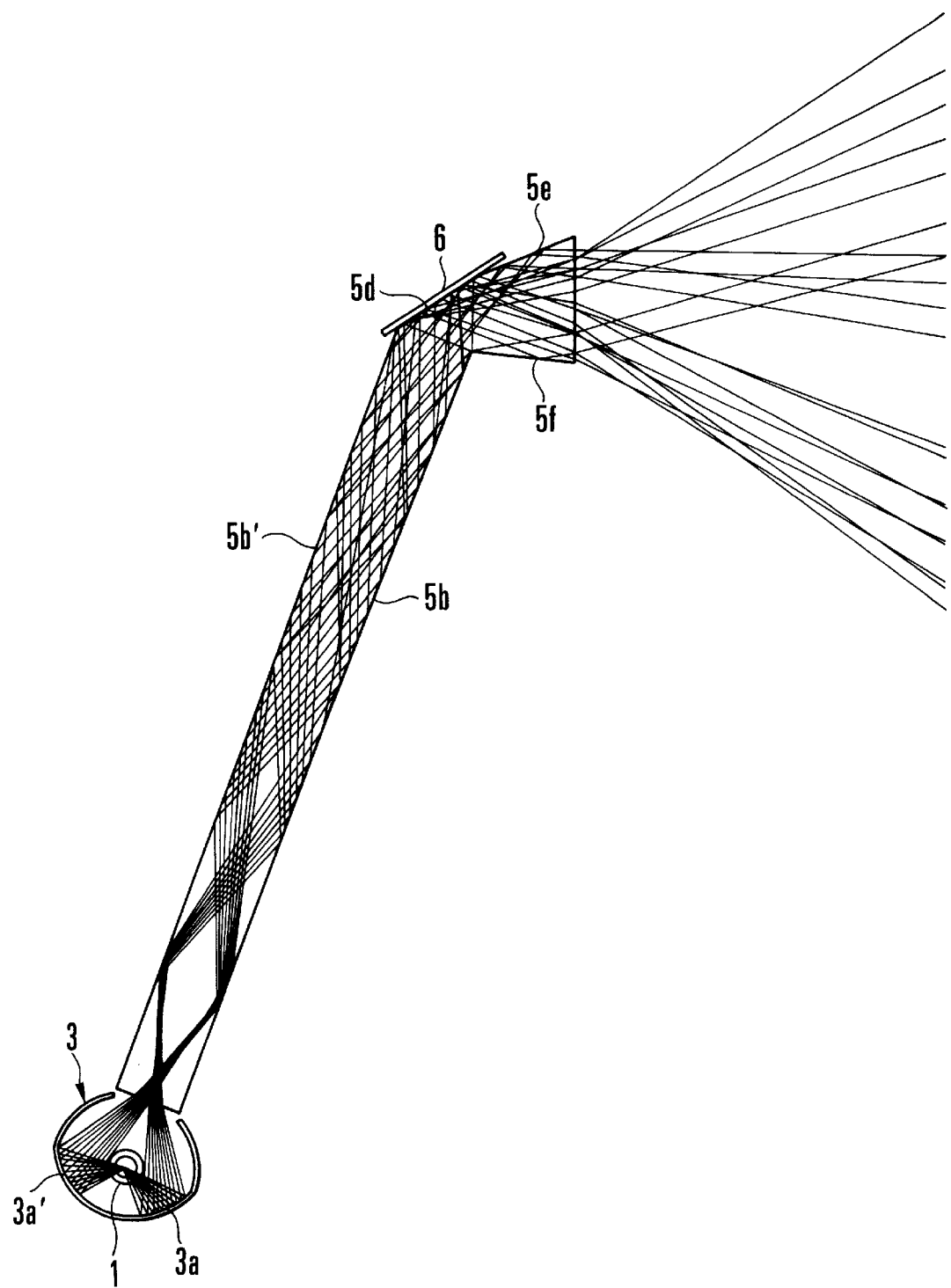
FIG. 5 is a further sectional view of the photo-taking illumination device of the first embodiment taken perpendicular to the flash lamp of the device.

FIG. 5 shows the traces of rays of light emitted obliquely rearward from the flash lamp 1. Since the flash lamp 1 is disposed at one focal point of the ellipse, the light flux after reflection advances in such a way as to converge at the other focal point of the ellipse. The entrance surface 5a of the optical panel 5 is arranged in the neighborhood of the other focal point to allow the light to fall thereon. As apparent from comparison with the case shown in FIG. 4, the incident rays of light coming from the entrance surface 5a in the case of FIG. 5 have a relatively large angle of incidence and widely scatter within the optical panel 5. However, the rays of light are guided by total reflection between the main reflecting surfaces 5b and 5b' toward the exit surface 5g. In this state, the rays of light impinging on the side of the main reflecting surface 5b immediately before the light direction changing surface 5d tend to include a large amount of component passing through the light direction changing surface 5d. Hence, this component is controlled to change its direction through the reflection at the reflecting plate 6 and the light direction correcting surface 5f for better light convergence.

Further, the rays of light which do not impinge on the light direction changing surface 5d after reflection by the main reflecting surface 5b' are arranged to be converged by changing their directions through the light direction correcting surface 5e. This state is selectively shown in FIG. 7. With each of the surfaces set at an optimum angle, an incident light flux which comes in a relatively wide angular state can be caused to make its exit from the light exit surface 5g in a converged state.

Figure 6:
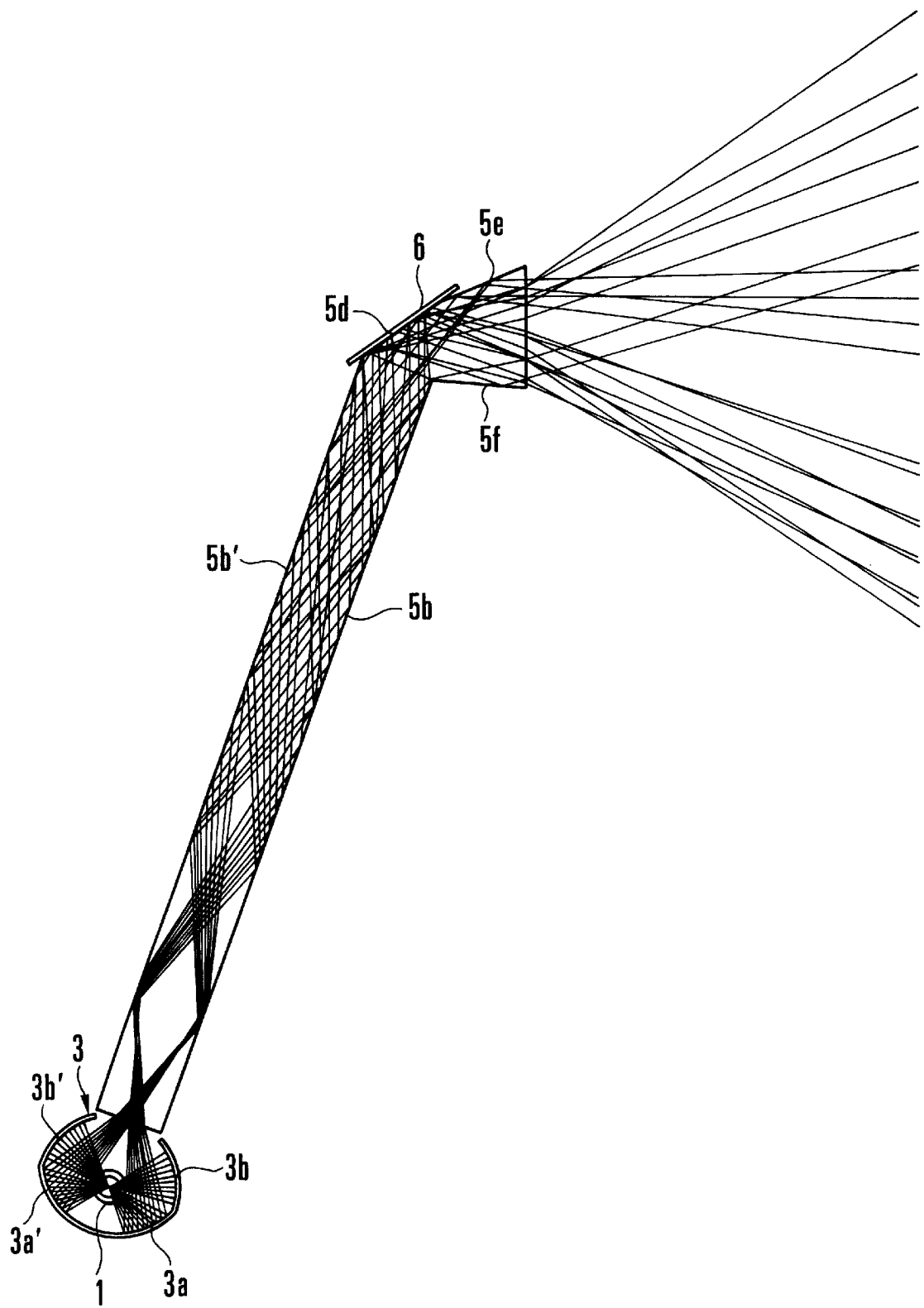
FIG. 6 is a further sectional view of the photo-taking illumination device of the first embodiment taken perpendicular to the flash lamp of the device.
Figure 7:
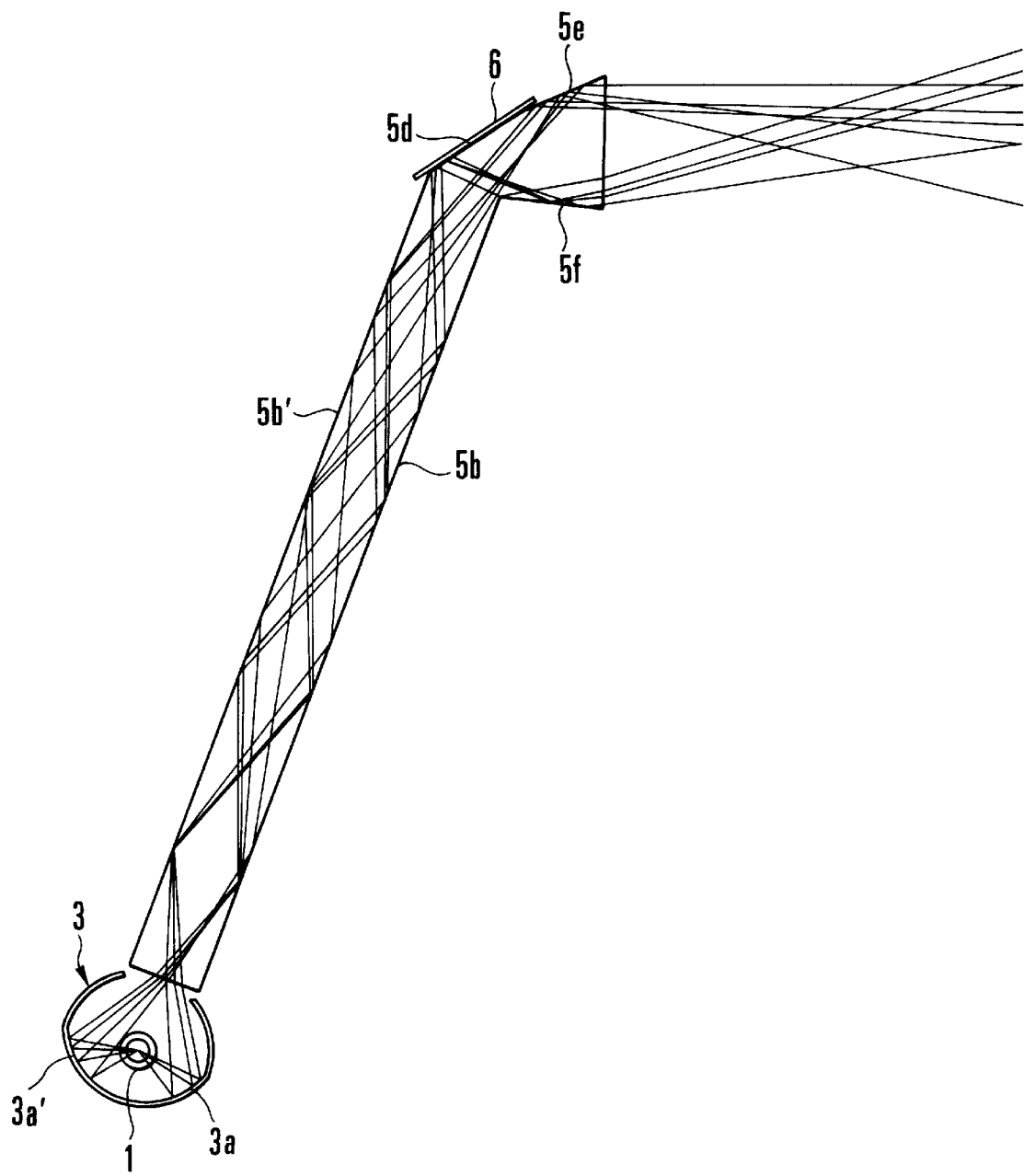
FIG. 7 is a still further sectional view of the photo-taking illumination device of the first embodiment taken perpendicular to the flash lamp of the device.

Meanwhile, the rays of light emitted obliquely forward from the flash lamp 1 as shown in FIG. 6 are reflected by the cylindrical surface to come back to the position of the flash lamp 1 and, after that, make their exit through the optical panel 5 in an optical path which is similar to what is shown in FIG. 5.

The traces of rays of light emitted from the center 1a of the flash lamp 1 are as described above with reference to FIGS. 3 to 7 which are sectional views taken perpendicular to the flash lamp 1 of a photo-taking illumination device. In a case where the size of the flash lamp 1 is sufficiently small relative to that of the reflecting shade 2, the relation which has been described above is approximately established. The loss of light within the reflecting shade 2 tends to increase accordingly as the ratio in size between the flash lamp 1 and the reflecting shade 2 increases. However, the above-stated relation can be retained for the majority of the rays of light emitted from around the center 1a of the flash lamp 1. Therefore, according to the arrangement of the embodiment described, a flash light emitting part can be arranged to have only a small loss of light and an excellent light converging characteristic by virtue of the total reflection arrangement.

FIGS. 8 to 13 are sectional views taken in the direction of the axis of the flash lamp 1 of the photo-taking illumination device arranged as shown in FIG. 1. These sectional views show the traces of representative rays of the light flux emitted from the center of the flash lamp 1. Although the actual optical path is bent, the light exit surface 5g is shown in these drawings, for the sake of illustration, as being arranged to allow the rays of light to make their exit directly therefrom. In FIGS. 8 to 13, the optical path obtained after emission of the rays of light is shown in six different ways.

Figure 8:
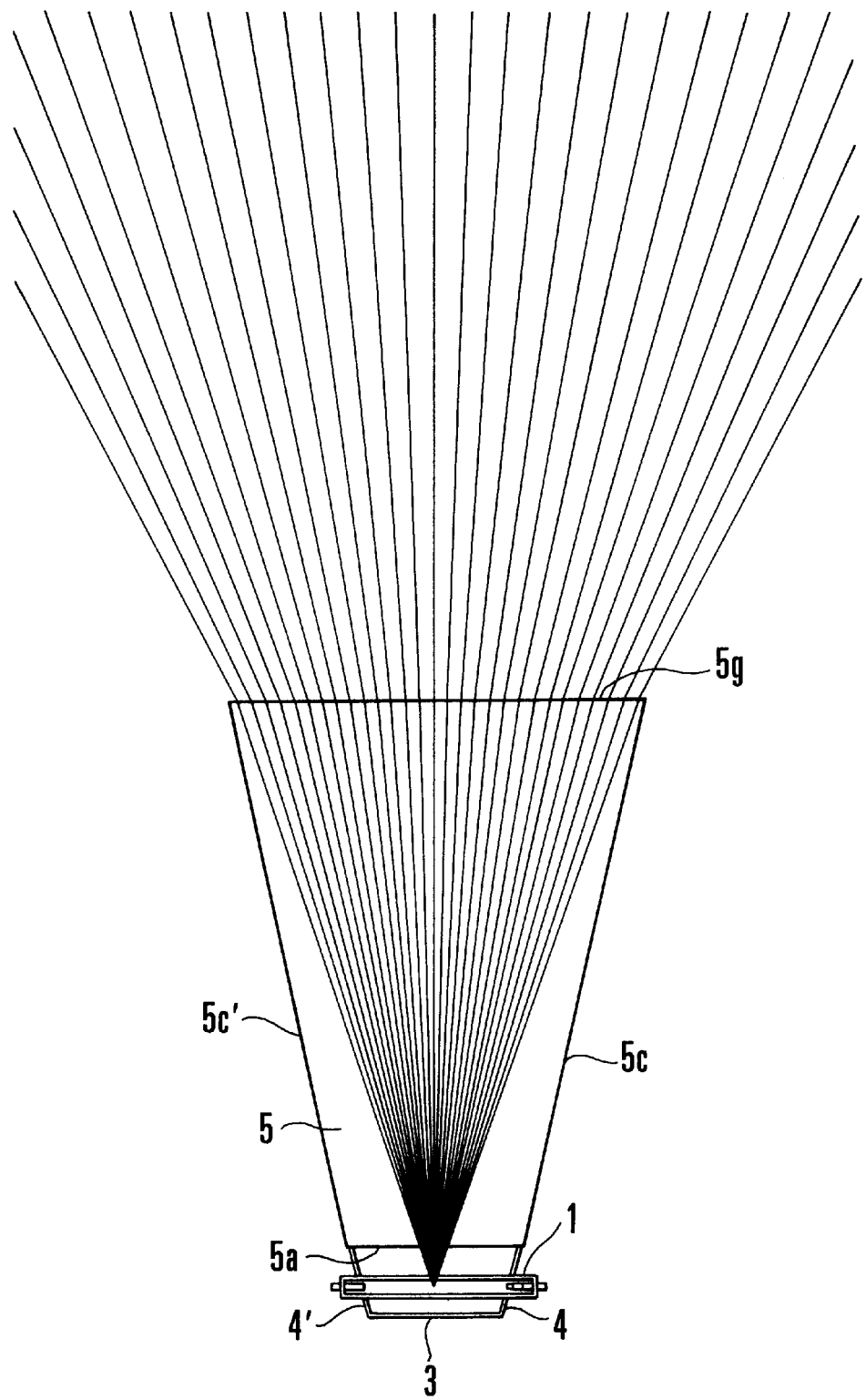
FIG. 8 is a sectional view taken along the optical axis of the flash lamp of the photo-taking illumination device of the first embodiment.

FIG. 8 shows a light component which comes into the light entrance surface 5a of the optical panel 5 directly from the flash lamp 1 and makes its exit from the light exit surface 5g without being reflected by side surfaces. Since the light entrance surface 5a and the light exit surface 5g are arranged in parallel to each other, there is no difference in distribution of luminous intensity between a state obtained at the time of entrance and a state obtained at the time of exit. The luminous intensity distribution of this light component is similar to that of the conventional flash device and effectively applied to the surface of an object of shooting.

Figure 9:
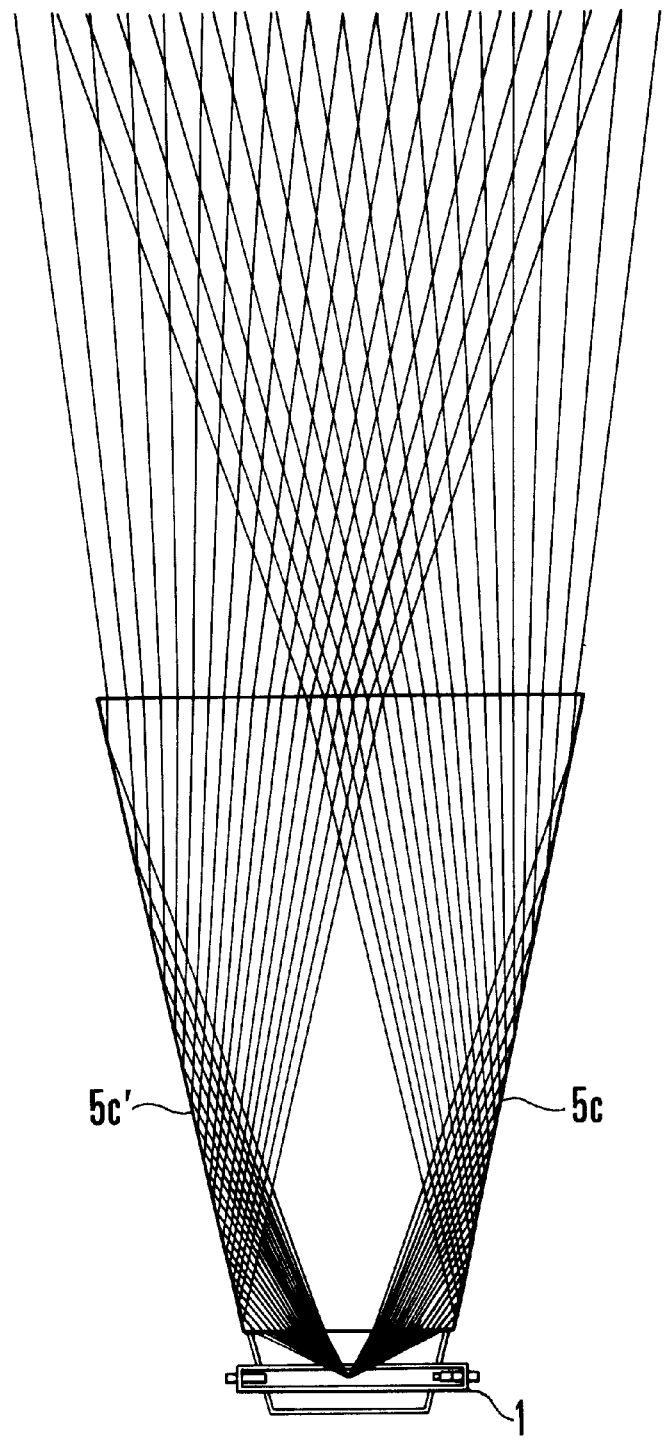
FIG. 9 is another sectional view taken along the optical axis of the flash lamp of the photo-taking illumination device of the first embodiment.

FIG. 9 shows a light component which comes into the light entrance surface 5a of the optical panel 5 directly from the flash lamp 1 and makes its exit from the light exit surface 5g after being total-reflected by the side reflecting surfaces 5c and 5c'. As shown, the side reflecting surfaces 5c and 5c' are arranged to gradually spread from the entrance surface side toward the exist surface side. Therefore, the light component can be efficiently converged. While it has been impossible to rescue this light component by means of the side reflection mirror of the conventional flash device, it becomes possible to use this light component according to this invention. In the case of the first embodiment, the side reflecting surfaces 5c and 5c' are formed to be in a planar shape. However, with these side reflecting surfaces 5c and 5c' formed to be in an optimum shape, such as quadratic surfaces, a luminous intensity distribution can be obtained as desired. In this (first) embodiment, the side reflecting surfaces 5c and 5c' are arranged at such slanting angles that the light can be total-reflected without passing through the side reflecting surfaces irrespective of a point where the light is emitted from within the flash lamp 1.

Figure 10:
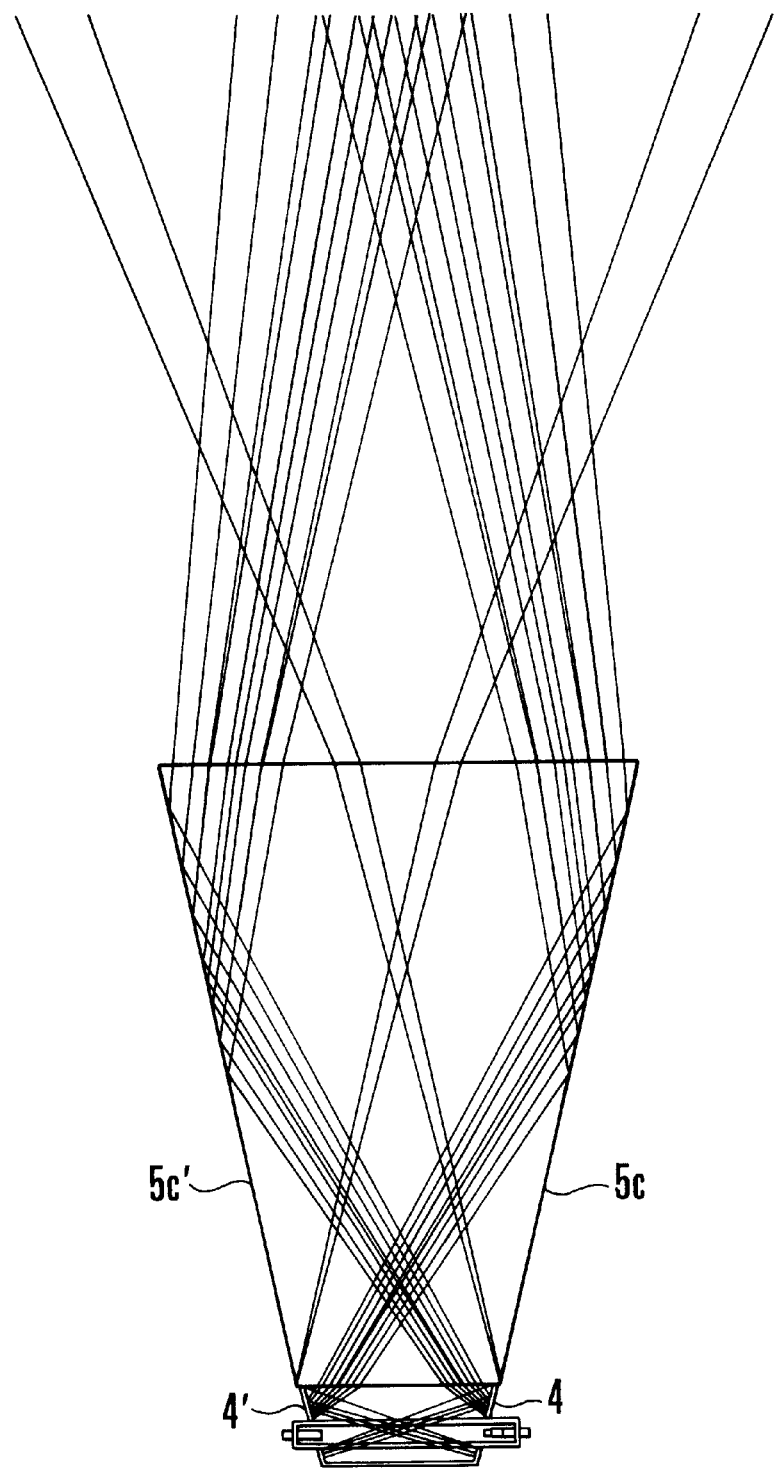
FIG. 10 is a further sectional view taken along the optical axis of the flash lamp of the photo-taking illumination device of the first embodiment.

FIG. 10 shows a light component which is emitted from the flash lamp 1 and reflected by the side reflecting surfaces 4 and 4' of the reflecting shade 2 before it comes to the optical panel 5 to go out through the optical panel 5. As shown, the majority of rays of this light component are emitted at acute angles with respect to the flash lamp 1. Despite of the acute angles of emission, the light component is directed to the object of shooting in a state of being converged after being reflected twice through the side reflecting surfaces 4 and 4' of the reflecting shade 2 and the side reflecting surfaces 5c and 5c' of the optical panel 5. The side reflecting surfaces 5c and 5c' serve to total-reflect the light component also in this instance.

In order to attain this advantageous effect by using the reflecting shade of the conventional device, the side reflecting surfaces 4 and 4' of the reflecting shade 2 must be arranged to have a greater degree of inclination. However, such arrangement not only necessitates an increase in size of the aperture part of the reflecting shade 2 but also increases the loss of light quantity as the rays of light, in actuality, escape without impinging on the side reflecting surfaces 4 and 4'. Therefore, it has been impossible to effectively control the illumination light.

Figure 11:
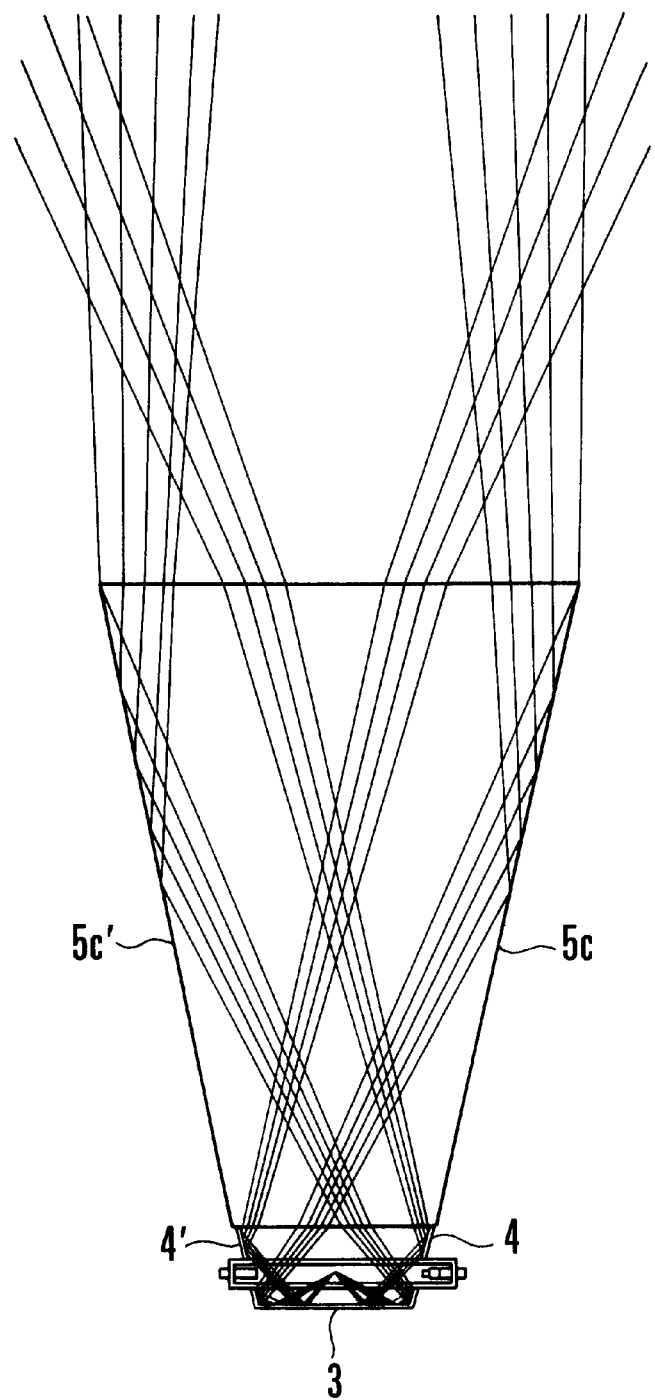
FIG. 11 is a further sectional view taken along the optical axis of the flash lamp of the photo-taking illumination device of the first embodiment.

FIG. 11 shows a light component which is reflected by the main reflecting surface 3 of the reflecting shade 2 in rear of the flash lamp 1 and then is reflected by the side reflecting surfaces 4 and 4' of the reflecting shade 2 before coming into the optical panel 5. As shown, rays of the light component which impinge on the rear sides of the side reflecting surfaces 4 and 4' come into the optical panel 5 to be reflected by the side reflecting surfaces 5c and 5c' of the optical panel 5 before they go out. Further, other rays of the light component which impinge on the front side of the side reflecting surfaces 4 and 4' go out from the light exit surface 5g without being reflected by the side reflecting surfaces 5c and 5c' after they come into the optical panel 5. While this light component can be controlled to a certain extent by the reflecting shade of the conventional device, the light converging efficiency can be enhanced by the use of the side reflecting surfaces 5c and 5c'.

Figure 12:
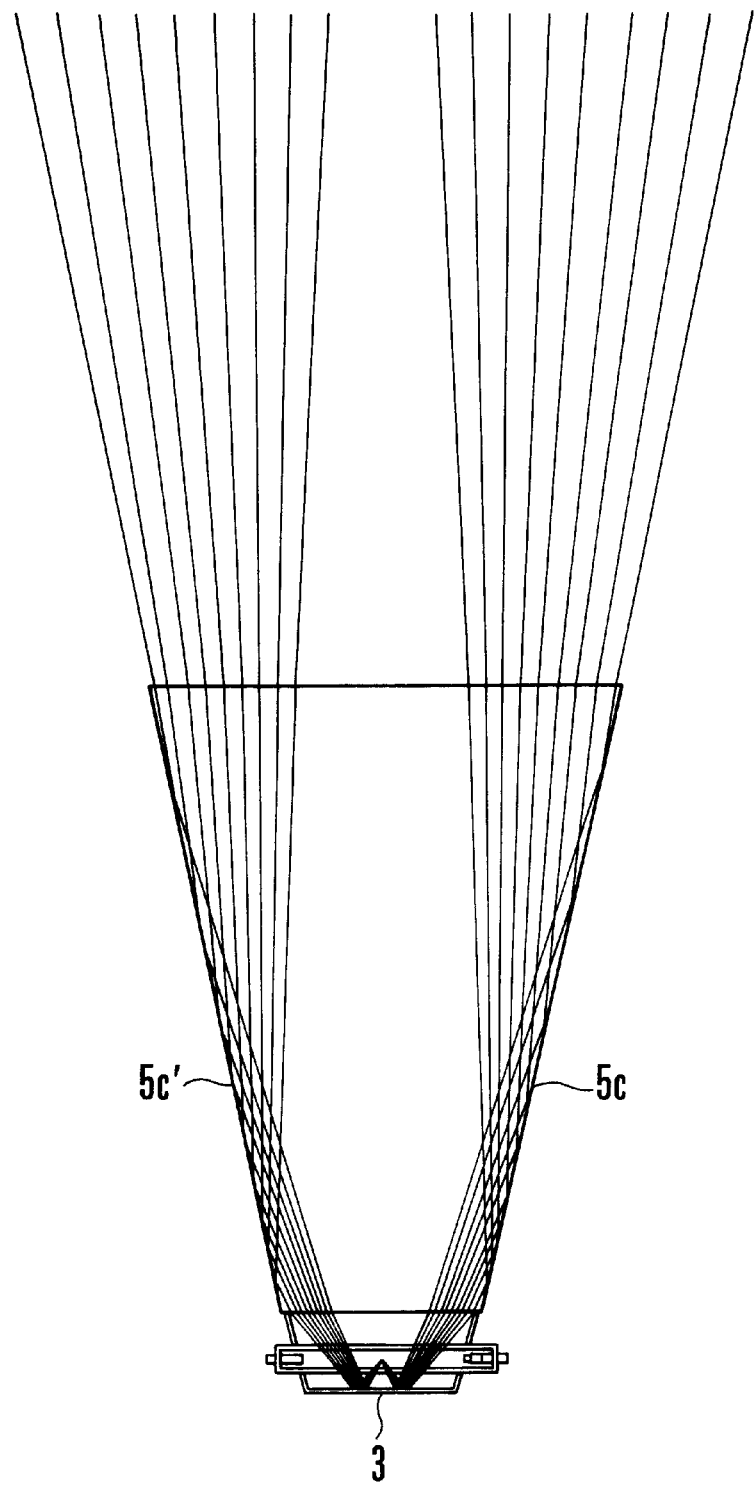
FIG. 12 is a further sectional view taken along the optical axis of the flash lamp of the photo-taking illumination device of the first embodiment.

FIG. 12 shows a light component which comes into the optical panel 5 after it is reflected by the main reflecting surface 3 of the reflecting shade 2 after emission from the flash lamp 1, and is then reflected by the side reflecting surfaces 5c and 5c' before it makes its exit. It has been impossible to control this light component by the reflecting shade of the conventional device. However, in the case of this embodiment, the use of the optical panel 5 permits effective utilization of this light component.

Figure 13:
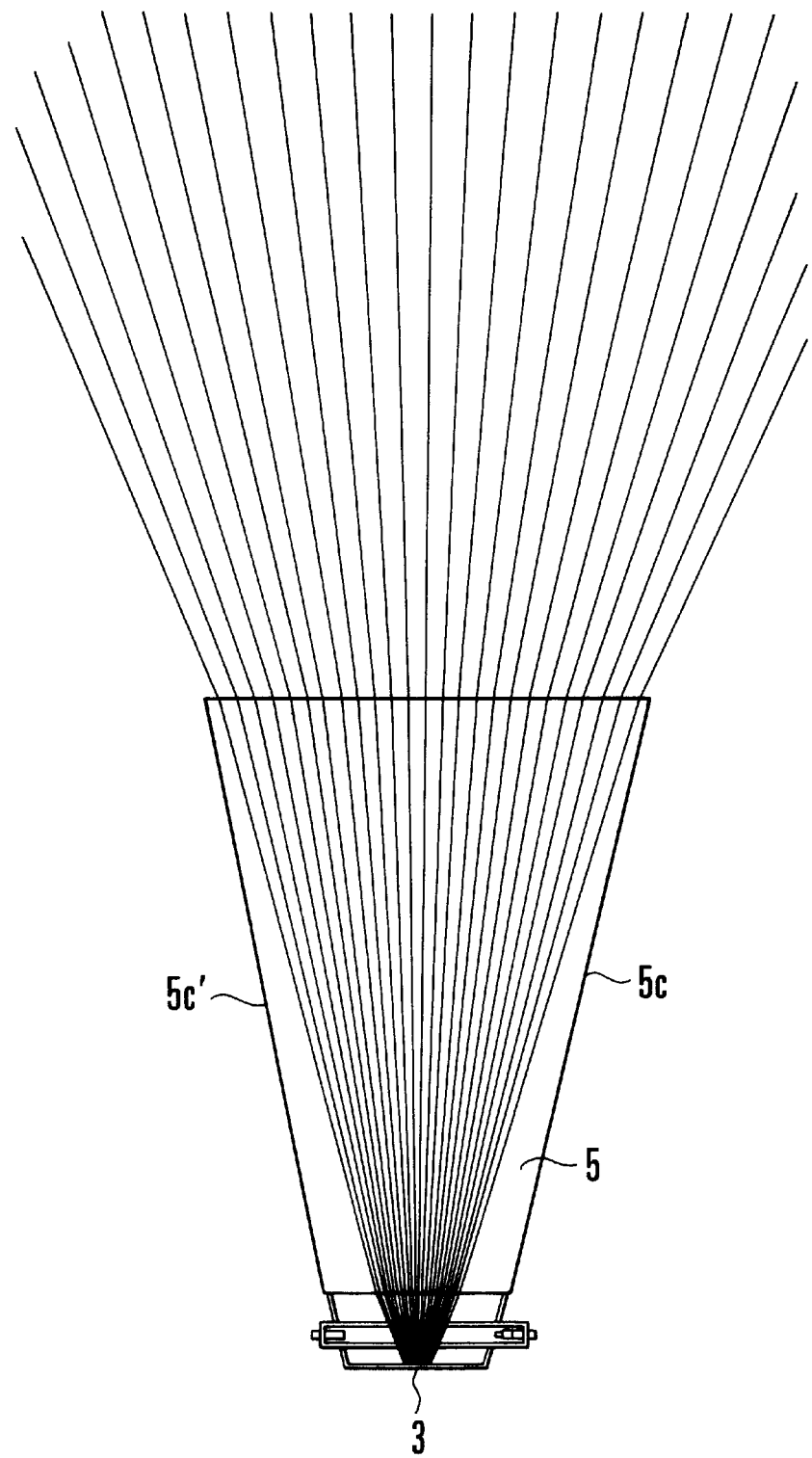
FIG. 13 is a still further sectional view taken along the optical axis of the flash lamp of the photo-taking illumination device of the first embodiment.

FIG. 13 shows a light component which comes into the optical panel 5 after it is reflected by the main reflecting surface 3 of the reflecting shade 2, after emission from the flash lamp 1, and then makes its exit without being reflected by the side reflecting surfaces 5c and 5c' of the optical panel 5. Since the entrance and exit surfaces of the optical panel 5 are in parallel to each other, that light component is usable in the same manner as in the case of the conventional device irrespective of the presence or absence of the optical panel 5.

As apparent from the above description, the optical system of the first embodiment has an advantage equivalent to a case where a side reflection mirror is arranged in a large size. Besides, since the reflecting action is performed by the total reflecting arrangement, there is no loss of light quantity due to reflection factor. As shown in the drawings, all the light flux components emitted from the center and around the center of the flash lamp can be effectively used. Although it is omitted from the drawings, all the rays of light that are emitted from the peripheral parts of the flash lamp 1 can be guided by total reflection within the optical panel 5 and thus can be also effectively used. Further, the illuminating angle can be easily set at a desired value by optimizing the side reflecting surfaces 5c and 5c'.

According to the arrangement of this embodiment, as described above, the use of a thin optical panel enables the illumination device to efficiently guide the rays of light in terms of space and to efficiently use such a light component that would be lost by the conventional method.

In stowing the photo-taking illumination device within a camera, the layout of the camera becomes as described below with reference to FIG. 14 which is a longitudinal sectional view of the camera.

Figure 14:
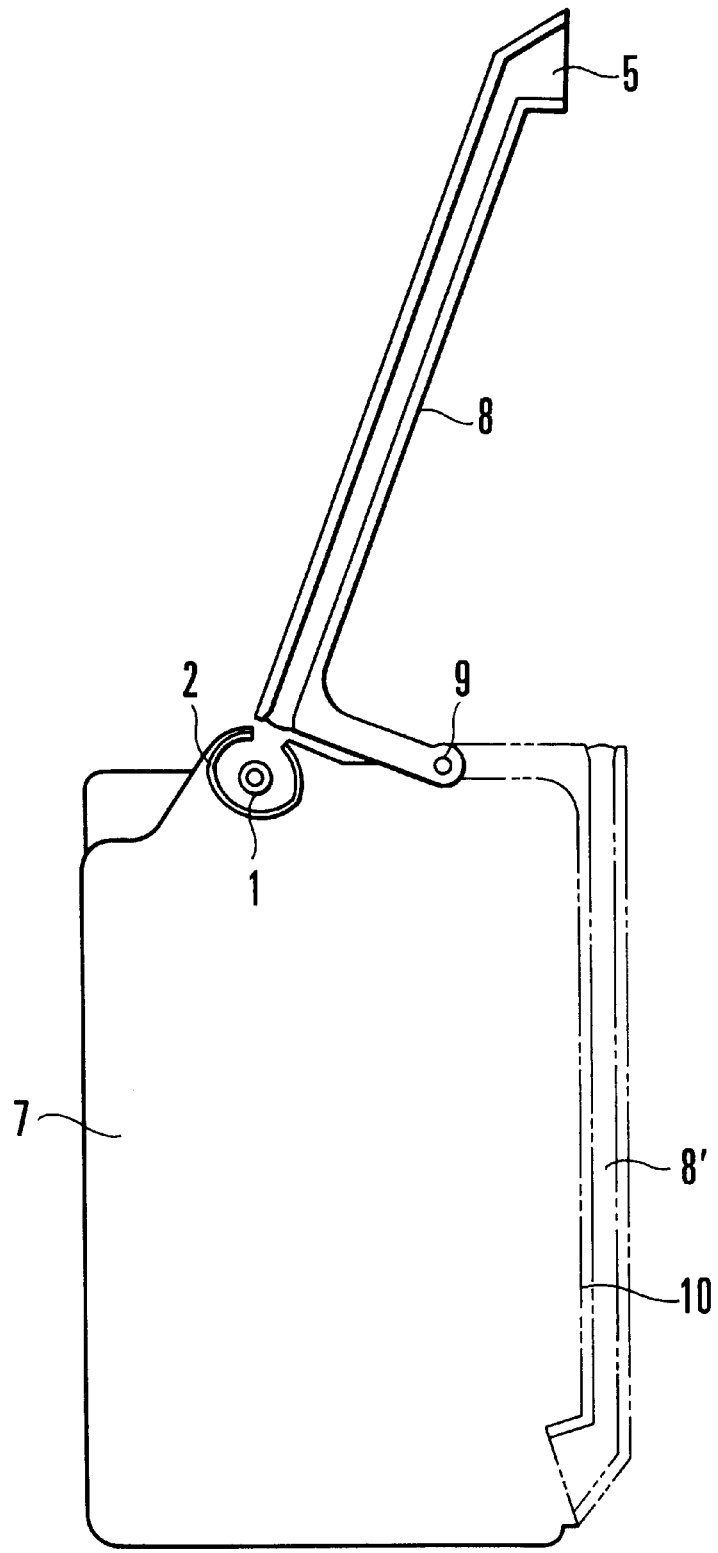
FIG. 14 is a longitudinal sectional view showing essential parts of a camera incorporating therein the photo-taking illumination device of the first embodiment.

Referring to FIG. 14, the illumination device is composed of the flash lamp 1, the reflecting shade 2 and the optical panel 5. Reference numeral 7 denotes a camera body. A holding member 8 is arranged to hold the optical panel 5 and to be swingable on a hinge shaft 9.

As shown, the flash lamp 1 and the reflecting shade 2 are secured to an upper part of the camera body 7. The holding member 8 which has the optical panel 5 disposed therein and is swingable on the hinge shaft 9 is arranged in such a way as to have the light entrance surface, i.e., a plane of incidence, of the optical panel 5 in a position indicated by full lines in the drawing when the illumination device is in use. With the holding member 8 in this position, a red-eye phenomenon can be prevented by having the light exit part of the optical panel 5 located away from the camera body 7.

The holding member 8 serves not only to hold the optical panel 5 without any adverse effect on the optical characteristic of the device (by holding it with a minimal area of a part whereby the optical characteristic is not easily affected) but also to prevent the total reflecting surfaces from inadequately total-reflecting and from being damaged by an external force as they are away from the outside of the camera body 7. When the camera is to be carried and not used, the holding member 8 is swung downward, as viewed on the drawing, on the hinge shaft 9 into a state of covering the front surface 10 of the camera, as indicated by two-dot chain lines 8' in FIG. 14. The holding member 8 thus serves also as a barrier member.

Figure 15A:
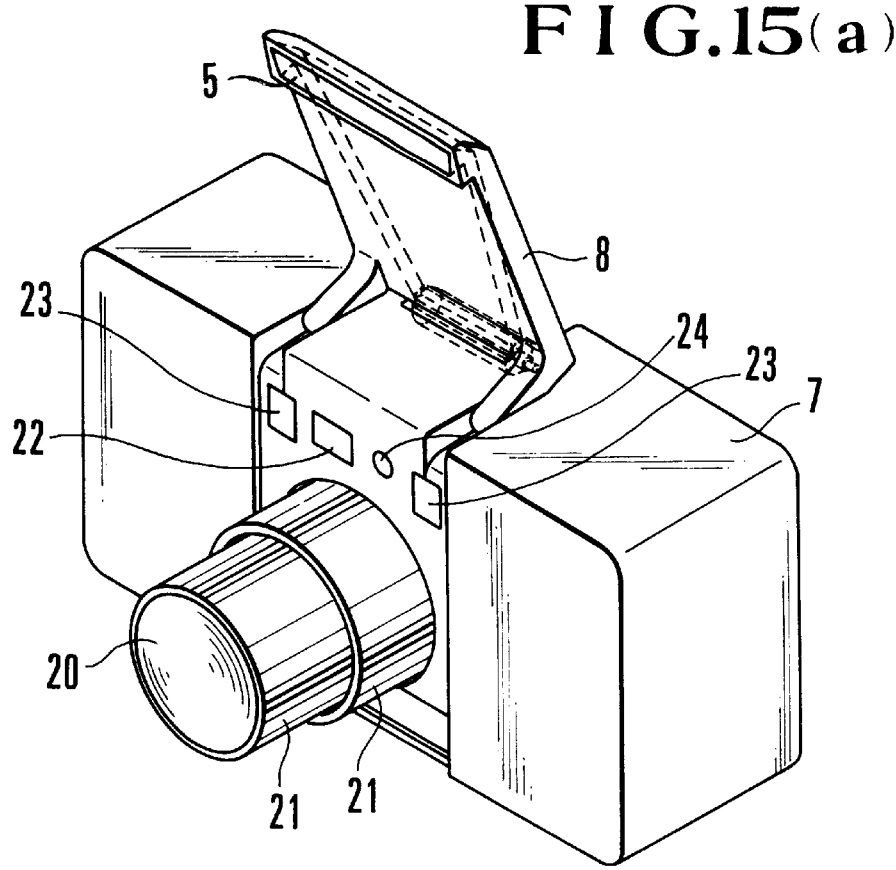
FIGS. 15(a) and 15(b) are oblique views of the camera shown in FIG. 14.
Figure 15B:
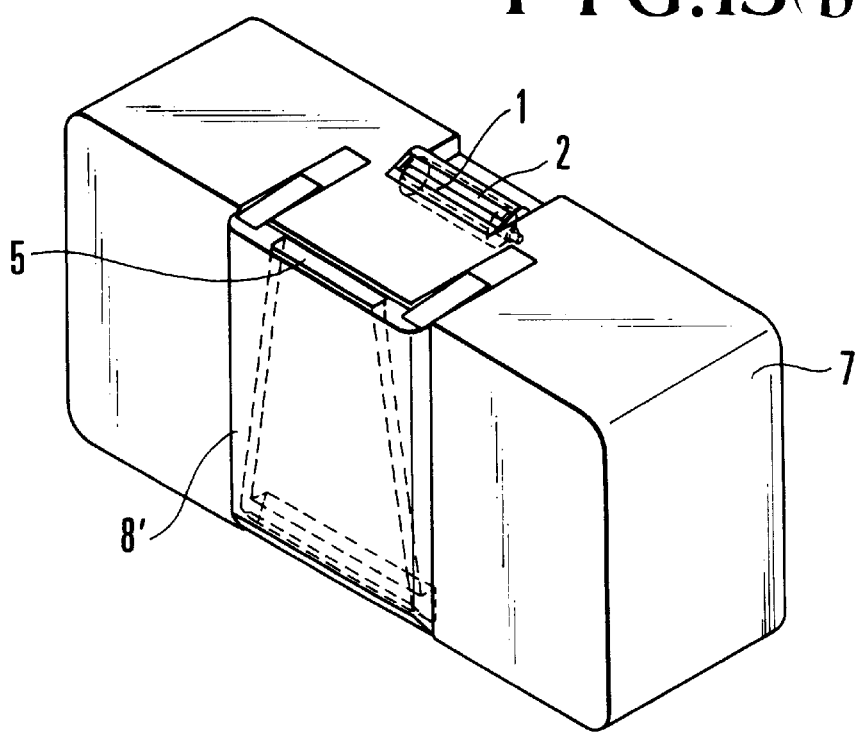

FIGS. 15(a) and 15(b) are oblique views of the camera. FIG. 15(a) shows the camera in a state of not having its front surface covered by the holding member 8. FIG. 15(b) shows the camera in a state of having its front surface covered by the holding member 8. As shown, various parts of the camera are arranged on the front side of the camera, including a photo-taking lens 20, a lens barrel part 21, a viewfinder objective lens 22, an AF optical system 23, a light measuring window 24, etc. The optical systems of varied kinds, therefore, can be protected by holding the holding member 8 in its position 8' as shown in FIG. 15(b).

The shape of the optical panel 5 is not limited to the planar shape but may be arranged in some other shape that permits a more efficient light converging action. For example, as shown in part in FIG. 14, the light entrance surface may be formed in a convex shape for enhancing the light converging power, in such a way as to facilitate control over the light of the rear part by arraying the directions of rays of light. It is also conceivable to change the light exit surface 5g to have a convex shape for converging the light. The light direction changing surface 5d may be changed to have a curved surface for facilitating total reflection. Further, as mentioned in the foregoing, the side reflecting surfaces 5c and 5c' may be arranged to have curved surfaces in such a way as to make the light converging characteristic variable.

The electric parts mounted around the flash light emitting part are disposed within the camera body 7 and the optical panel 5 is alone arranged to be movable. Therefore, the optical system can be easily arranged at a low cost to be efficient and, at the same time, to be capable of preventing the red-eye phenomenon.

Second Embodiment

Figure 16:
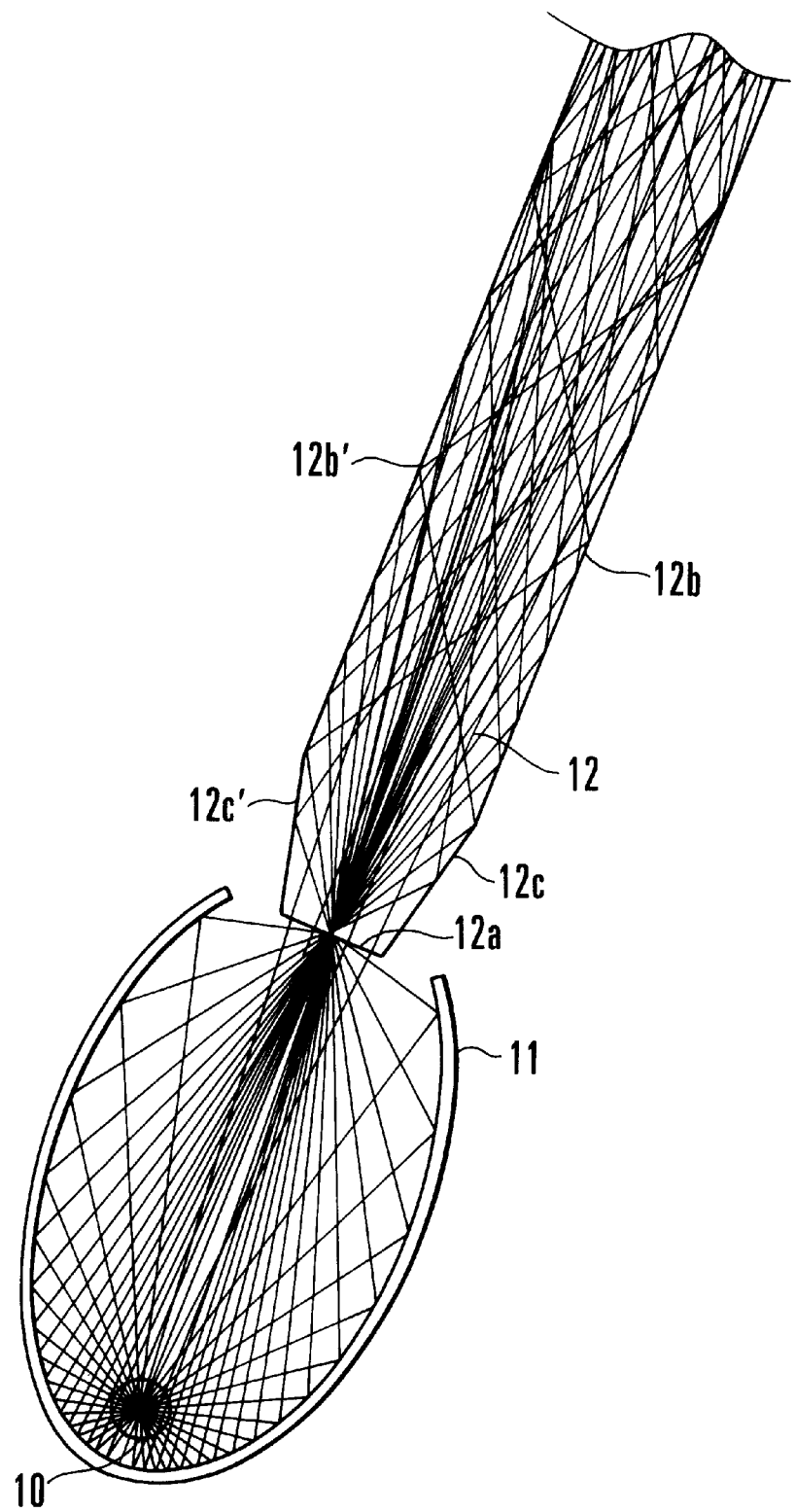
FIG. 16 is a sectional view of a photo-taking illumination device of a second embodiment of this invention taken perpendicular to a flash lamp thereof.
Figure 17:
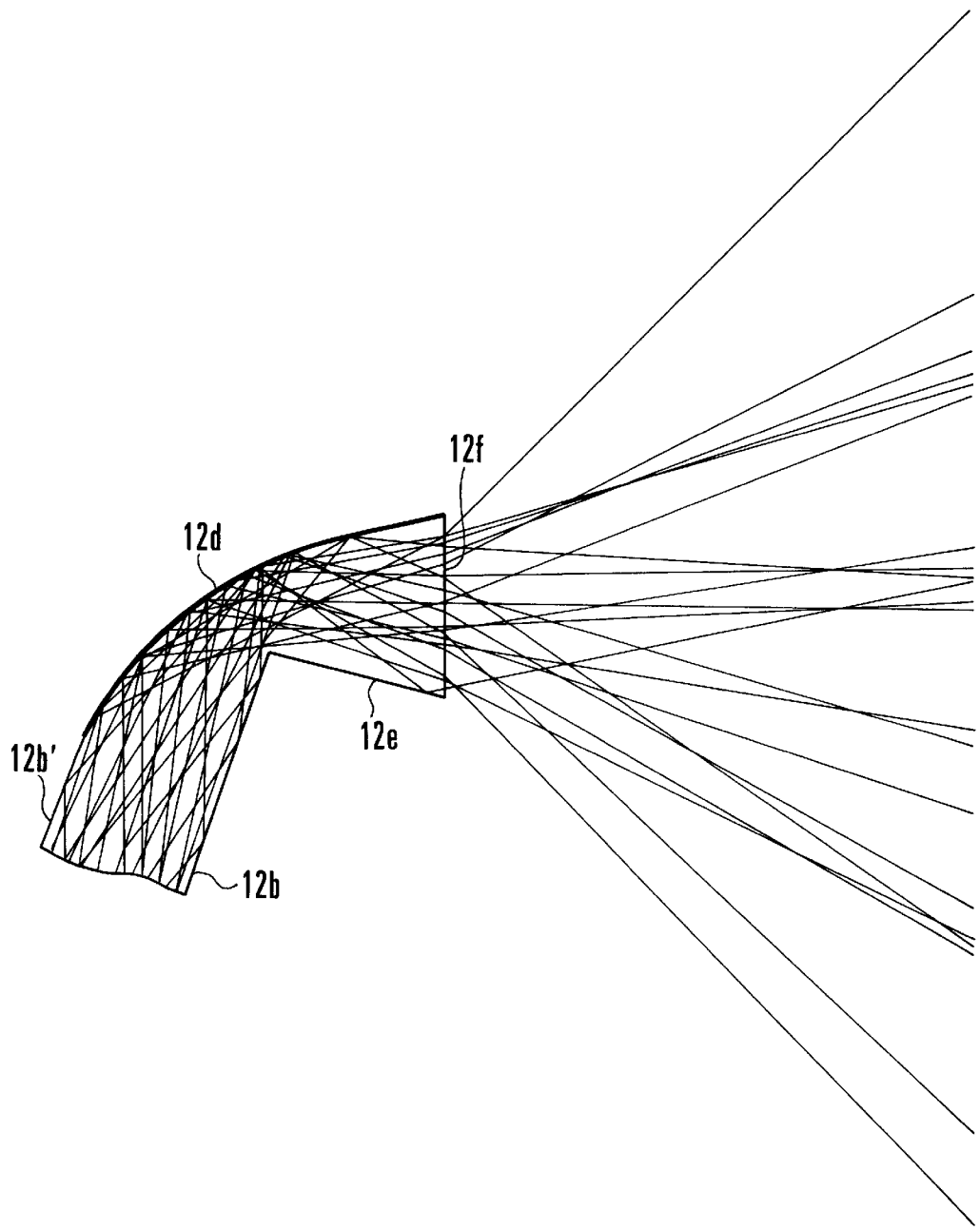
FIG. 17 is another sectional view of the photo-taking illumination device of the second embodiment taken perpendicular to the flash lamp.

FIGS. 16 and 17 show the arrangement of essential parts of a photo-taking illumination device which is arranged according to this invention as a second embodiment thereof. These figures are sectional views taken perpendicular to a flash lamp and show the traces of representative rays of a light flux emitted from the center of the flash lamp.

Referring to FIGS. 16 and 17, a flash lamp 10 is a light source. A reflecting shade 11 is formed in an approximately elliptic shape having one focal point at the center of the flash lamp 10 and has a quadratic surface extending forward and rearward with respect to the paper surface of the drawing. An optical panel 12 has a light entrance surface 12a disposed in the neighborhood of the other focal point of the elliptic reflecting shade 11.

In the optical panel 12, main reflecting surfaces 12b and 12b' are arranged to guide light by total-reflecting the light, like in the case of the optical panel 5 of the first embodiment described in the foregoing. Incident light correcting surfaces 12c and 12c' are arranged to correct acute angle components among other rays of light incident on the light entrance surface 12a. A light direction changing surface 12d is curved to direct the rays of light toward an object of shooting. The surface 12d is formed by vapor-depositing a metal such as aluminum or silver to reflect light with a high reflection factor, for the purpose of preventing light from going rearward. A total reflecting surface 12e is arranged to control the rays of light after they are reflected by the light direction changing surface 12d. Reference numeral 12f denotes a light exit surface.

The second embodiment is characterized in the following points. An elliptic surface is used as the reflecting shade 11 for converging light. The light coming from the flash lamp 10 is basically converged at one point. The converged light is caused to enter the optical panel 12 to be further converged within the optical panel 12 before going out from the light exit surface 12f for illumination.

It is a prerequisite for this embodiment that the glass tube of the flash lamp 10 does not bring about much adverse effect. In other words, the thickness of the glass tube is thin or the diameter of the flash lamp 10 is small relative to the size of the whole reflecting shade 11. With this prerequisite satisfied, the amount of such rays of light that do not come outside of the reflecting shade by just repeating reflection within the reflecting shade can be minimized.

As apparent from FIG. 16, the rays of light incident on the light entrance surface 12a diffuse within a relatively wide range of angles. The incident light correcting surfaces 12c and 12c' are provided for correcting rays of light having acute angles among the incident rays of light. While the drawing shows rays of light coming from around the center of the flash lamp 10, the directions of other rays of light deviating from this middle part of the flash lamp 10 are also effectively corrected by the incident light correcting surfaces 12c and 12c', so that the light can be efficiently converged.

As shown also in FIG. 17, since the light direction changing surface 12d is coated with a vapor-deposited metal, no rays of light leak to the outside. Therefore, light directions can be changed without much loss of light quantity by a compact device. The layout of the camera incorporating the illumination optical system of the second embodiment is the same as in the case of the first embodiment described in the foregoing.

While the second embodiment is arranged to have a metal applied to the light direction changing surface 12d by vapor deposition, this arrangement may be changed to have total reflection all over. A plurality of reflecting directions at the light direction changing surface as shown in the drawing results in efficient convergence of light.

Third Embodiment

Figure 18:
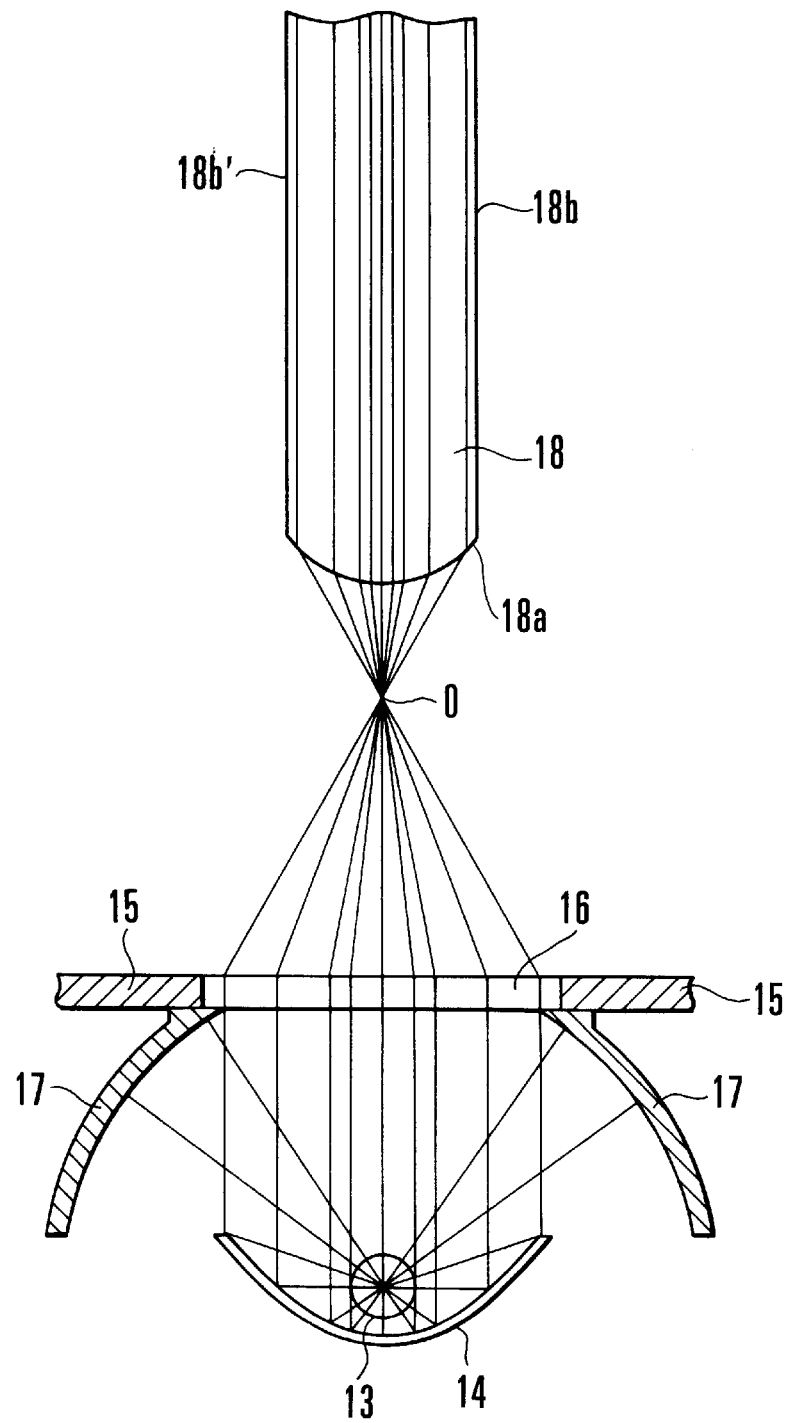
FIG. 18 is a sectional view of a photo-taking illumination device of a third embodiment of this invention taken perpendicular to a flash lamp thereof.

FIG. 18 shows the arrangement of essential parts of a photo-taking illumination device which is arranged as a third embodiment of this invention. FIG. 18 is a sectional view taken perpendicular to a flash lamp of the device showing also the traces of representative rays of a light flux emitted from the center of the flash lamp.

The third embodiment is characterized in that the light emitted from the flash lamp is rearranged into a predetermined direction before it comes into an optical panel. The further arrangement of the third embodiment is about the same as the above-described embodiments.

Referring to FIG. 18, a cylindrical flash lamp 13 serves as a light source of the illumination device. A reflecting shade 14 has a parabolic surface shape having a focal point at the center of the flash lamp 13. Both the flash lamp 13 and the reflecting shade 14 extend forward and rearward from the paper surface of the drawing and are fixedly held by a camera body. An exterior member 15 is mounted on the outside of the camera body. A Fresnel lens 16 is mounted on the exterior member 15 and has such an optical characteristic that parallel rays of incident light can be converged at one point O as viewed on the sectional view (in a strip-like shape). A cylindrical reflecting member 17 has a reflecting surface on the side of the flash lamp 13 and is arranged to bring rays of light emitted from around the center of the flash lamp 13 back to the center of the flash lamp 13. An optical panel 18 is disposed in front of the Fresnel lens 16 and has a light entrance surface 18a which is in a convex shape. The optical panel 18 also has main reflecting surfaces 18b and 18b', which are arranged to make total reflection in the same manner as in the cases of the first and second embodiments.

With the third embodiment arranged as described above, rays of light emitted rearward from the flash lamp 13 toward the reflecting shade 14 are reflected approximately into a parallel state by the reflecting shade 14. The parallel rays of light are then converged by the Fresnel lens 16 at the point O to cross one another before they come into the optical panel 18. In this instance, since the light entrance surface 18a of the optical panel 18 is formed in a convex shape, the rays of light are converted into approximate parallel rays of light after the entrance and advance in the breadth direction of the optical panel 18.

Rays of light emitted obliquely forward from the flash lamp 13 impinge on the reflecting member 17 which has its center at the flash lamp 13. The rays of light are then reflected by the reflecting member 17 back to the center of the flash lamp 13. After that, the rays of light come to advance within the optical panel 18 through the same optical path as the one described above. The shape of the optical panel 18 extending forward from the light entrance surface 18a is configured to change the directions of rays of light, before they go out, in the same manner as in the case of the first embodiment.

Since the flash light emitting part is disposed in the camera body while the light guiding part is alone disposed away from the camera body, a highly efficient optical system having not much loss of light can be easily arranged according to the arrangement of each of the embodiments described.

Further, according to the arrangement of each of the embodiments described, light can be guided, with little loss of light quantity, and converged, so that the photo-taking illumination device can be arranged to be capable of efficiently illuminating a shooting object.

Since light emitted from the flash light emitting means disposed in the camera body can be transmitted to a part located away from the camera body, a camera can be simply arranged, according to the arrangement of each of the embodiments described, to prevent a red-eye phenomenon and to carry out a photo-taking illumination without lowering its illuminating efficiency.

While it has not been stated in the foregoing description of the first, second and third embodiments, each of these embodiments can be arranged to be capable of varying the angle of illumination in the same manner as one of known methods. For this purpose, the diffused state of light may be arranged to be varied through a member which is arranged to vary a degree of diffusion between the light entrance surface of the optical panel and the reflecting shade (for example, by moving a diffusing plate or using a liquid crystal by which the degree of diffusion is variable). Further, the illumination angle may be arranged to be variable by moving a lens disposed in front of the light exit surface of the optical panel. The illumination angle is easily variable by any of these methods, so that a distribution of luminous intensity can be obtained as desired for a zoom lens.

Each of the first, second and third embodiments has been described as being arranged to optimize the light converging degree within the optical panel by the shape of the optical panel. However, this invention is not limited to this optimizing method. For example, a material (GI) which varies its refractive index in the direction of thickness may be used within the optical panel to enable the device to have a power in the direction of the thickness of the optical panel. With such a material used, a desired distribution of luminous intensity can be obtained with a smaller optical panel.

Further, while this invention has been described with respect to what is presently considered to be the preferred embodiments, it is to be understood that this invention is not limited to the disclosed embodiments. To the contrary, this invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

This invention may be carried out by combining as necessary the embodiments or their technological elements described in the foregoing.

This invention applies to cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming these apparatuses and devices.

What is claimed is:

1. An illumination apparatus comprising:
    light-emitting device, said light emitting device having an elongated shape; and
    an optical member for guiding, through a material, light emitted from said light-emitting device in a longitudinal direction of said optical member and converging the light while passing through the material so as to radiate the light emitted from said light emitting device toward an object,
    wherein said optical member: includes at least a portion of the material which continuously increases in cross sectional area in an advancing direction of the light guided through the material; has one cross-section at the light entering portion in the light advancing direction having a predetermined elongated continuous shape; and is arranged in such a manner that the lengthwise direction of the cross-section in the light advancing direction at the light entering portion coincides with the lengthwise direction of the light emitting device.

2. An apparatus according to claim 1, wherein said optical member includes means for being formed with a solid body.

3. An apparatus according to claim 2, wherein said optical member includes means for transmitting the light by total-reflecting the light within said solid body.

4. An apparatus according to claim 1, wherein said optical member includes means for being formed with a member which retains a predetermined shape.

5. An apparatus according to claim 1, further comprising directing means for directing the light emitted from said light-emitting device so as to cause the light to enter said optical member.

6. An apparatus according to claim 5, wherein said directing means includes a reflecting member which directs the light emitted from said light-emitting device by reflecting the light.

7. An apparatus according to claim 1, wherein said optical member includes means for guiding the light while converging the light.

8. An apparatus according to claim 7, wherein said optical member includes an entrance surface at which the light enters said member and an exit surface at which the light exits from said member, sail exit surface having a larger area than said entrance surface.

9. An apparatus according to claim 1, wherein said optical member is made of transparent material.

10. An apparatus according to claim 1, wherein said optical member is made of glass.

11. An apparatus according to claim 1, wherein said optical member is made of resin.

12. An illumination apparatus in accordance with claim 1 wherein:
    the width of the cross-section in the direction vertical to the lengthwise direction of the light emitting device at the light entering portion is larger than the width of the light emitting device in the same direction.

13. A camera comprising:
    light-emitting device, said light emitting device having an elongated shape; and
    an optical member for guiding, through a material, light emitted from said light-emitting device in a longitudinal direction of said optical member and converging the light while passing through the material so as to radiate the light emitted from said light emitting device toward an object,
    wherein said optical member includes: at least a portion of the material which continuously increases in cross sectional area in an advancing direction of the light guided through the material; has one cross-section at the light entering portion in the light advancing direction having a predetermined elongated continuous shape; and is arranged in such a manner that the lengthwise direction of the cross-section in the light advancing direction at the light entering portion coincides with the lengthwise direction of the light emitting device.

14. A camera according to claim 13, wherein said optical member includes means for being formed with a solid body.

15. A camera according to claim 14, wherein said optical member includes means for transmitting the light by total-reflecting the light within said solid body.

16. A camera according to claim 13, wherein said optical member includes means for being formed with a member which retains a predetermined shape.

17. A camera according to claim 13, further comprising directing means for directing the light emitted from said light-emitting device so as to cause the light to enter said optical member.

18. A camera according to claim 17, wherein said directing means includes a reflecting member which directs the light emitted from said light-emitting device by reflecting the light.

19. A camera according to claim 13, wherein said optical member includes means for guiding the light while converging the light.

20. A camera according to claim 19, wherein said optical member includes an entrance surface at which the light enters said member and an exit surface at which the light exits from said member, said exit surface having a larger area than said entrance surface.

21. A camera according to claim 13, further comprising a cover which covers an optical system of said camera, said optical member including means for being provided substantially integrally with said cover.

22. A camera according to claim 21, wherein said optical system includes means for coming into a state of guiding the light to a position located away from said camera when said optical system is not covered by said cover.

23. A camera according to claim 13, wherein said optical member is made of transparent material.

24. A camera according to claim 13, wherein said optical member is made of glass.

25. A camera according to claim 13, wherein said optical member is made of resin.

26. A camera in accordance with claim 13 wherein:
the width of the cross-section in the direction vertical to the lengthwise direction of the light emitting device at the light entering portion is larger than the width of the light emitting device in the same direction.

27. A camera comprising:
a light-emitting device disposed in a camera body, said light emitting device having an elongated shape; and
an optical member for guiding, through a material, light emitted from said light-emitting device, wherein said optical member: includes a light emission portion which emits the light from the material in a second direction different from a first direction which is an advancing direction of the light as the light is introduced from the light-emitting device into the material of the optical member, a first guide portion which guides the light in the first direction through the materials, a second guide portion which guides the light in the second direction through the material, said first guide portion being longer than said second portion; has one cross-section at the light entering portion in the light advancing direction having a predetermined elongated continuous share; and is arranged in such a manner that the lengthwise direction of the cross-section in the light advancing direction at the light entering portion coincides with the lengthwise direction of the light emitting device.

28. A camera according to claim 27, wherein said optical member includes means for guiding the light in a longitudinal direction of said member.

29. A camera according to claim 27, wherein said optical member includes means for being provided substantially integrally with a cover which covers a photo-taking optical system of said camera.

30. A camera according to claim 27, wherein said optical member is made of transparent material.

31. A camera according to claim 27, wherein said optical member is made of glass.

32. A camera according to claim 27, wherein said optical member is made of resin.

33. A camera according to claim 27, wherein said optical member includes means for guiding the light through the material while converging the light.

34. A camera according to claim 33, wherein said optical member includes a portion of cross sectional area continuously increasing in the advancing direction of the light guided through the material.

35. A camera according to claim 27, wherein said optical member includes means for guiding the light through the material in the first direction which is different from a direction toward the object from the camera body.

36. A camera according to claim 27, wherein said optical member includes means for emitting the light from the material in the second direction toward the object from the camera body.

37. A camera according to claim 27, wherein said optical member includes a portion which changes the direction of the light guided through the material from the first direction to the second direction.

38. A camera in accordance with claim 27 wherein:
the width of the cross-section in the direction vertical to the lengthwise direction of the light emitting device at the light entering portion is larger than the width of the light emitting device in the same direction.

39. An illumination apparatus, comprising:
a light-emitting device, said light emitting device having an elongated shape; and
an optical member for guiding, through a material, light emitted from said light-emitting device, wherein said optical member: includes a light emission portion which emits the light from the material in a second direction different from a first direction which is an advancing direction of the light as the light is introduced from the light-emitting device into the material of the optical member, a first guide portion which guides the light in the first direction through the material and a second guide portion which guides the light in the second direction through the material, said first guide portion being longer than said second portion; has one cross-section at the light entering portion in the light advancing direction having a predetermined elongated continuous shape; and is arranged in such a manner that the lengthwise direction of the cross-section in the light advancing direction at the light entering portion coincides with the lengthwise direction of the light emitting device.

40. An illumination apparatus in accordance with claim 39 wherein:
the width of the cross-section in the direction vertical to the lengthwise direction of the light emitting device at the light entering portion is larger than the width of the light emitting device in the same direction.

41. An illumination apparatus comprising:
light-emitting device, said light emitting device having an elongated shape; and
an optical member for guiding, through a material, light emitted from said light-emitting device in a longitudinal direction of said optical member and converging the light while passing through the material so as to radiate the light emitted from said light-emitting device toward an object, wherein said optical member: includes an emission portion for emitting the light from the material and an entrance portion for entrance of the light from the light-emitting device, said emission portion having a cross sectional area larger than that of the entrance portion; has one cross-section at the light entering portion in the light advancing direction having a predetermined elongated continuous shape; and is arranged in such a manner that the lengthwise direction of the cross-section in the light advancing direction at the light entering portion coincides with the lengthwise direction of the light emitting device.

42. An illumination apparatus in accordance with claim 41 wherein:

the width of the cross-section in the direction vertical to the lengthwise direction of the light emitting device at the light entering portion is larger than the width of the light emitting device in the same direction.

43. Camera comprising:

light-emitting device, said light emitting device having an elongated shape; and an optical member for guiding, through a material, light emitted from said light-emitting device in a longitudinal direction of said optical member and converging the light while passing through the material so as to radiate the light emitted from said light-emitting device toward an object, wherein said optical member: includes an emission portion for emitting the light from the material and an entrance portion for entrance of the light from the light-emitting device, said emission portion having a cross sectional area larger than that of the entrance portion; has one cross-section at the light entering portion in the light advancing direction having a predetermined elongated continuous share; and is arranged in such a manner that the lengthwise direction of the cross-section in the light advancing direction at the light entering portion coincides with the lengthwise direction of the light emitting device.

44. A camera in accordance with claim 43 wherein:

the width of the cross-section in the direction vertical to the lengthwise direction of the light emitting device at the light entering portion is larger than the width of the light emitting device in the same direction.

\* \* \* \* \*

UNITED STATES PATENT AND TRADEMARK OFFICE
CERTIFICATE OF CORRECTION

PATENT NO. : 6,058,271
DATED : May 2, 2000
INVENTOR(S) : Yoshiharu Tenmyo

It is certified that error appears in the above-identified patent and that said Letters Patent are hereby corrected as shown below:

Col. 4, line 48, delete "component A" and insert -- component B --.
Col. 6, line 30, delete "=" and insert -- $\overset{*}{=}$ --.
Col. 6, line 49, delete "light exist surface" and insert -- light exit surface --.
Col. 7, line 17, delete "5d" and insert -- 5f --.

Signed and Sealed this

Twenty-second Day of May, 2001

Attest:

NICHOLAS P. GODICI

*Attesting Officer*         *Acting Director of the United States Patent and Trademark Office*